(12) United States Patent
Jakobsson

(10) Patent No.: US 12,500,891 B2
(45) Date of Patent: Dec. 16, 2025

(54) SYSTEMS AND METHODS FOR PROTECTING AGAINST TOKEN-BASED MALICIOUS SCRIPTS

(71) Applicant: Artema Labs, Inc, Los Angeles, CA (US)

(72) Inventor: Bjorn Markus Jakobsson, New York, NY (US)

(73) Assignee: Artema Labs, Inc, Los Angeles, CA (US)

( * ) Notice: Subject to any disclaimer, the term of this patent is extended or adjusted under 35 U.S.C. 154(b) by 107 days.

(21) Appl. No.: 18/048,346

(22) Filed: Oct. 20, 2022

(65) Prior Publication Data
US 2023/0129900 A1 Apr. 27, 2023

Related U.S. Application Data

(60) Provisional application No. 63/270,092, filed on Oct. 21, 2021.

(51) Int. Cl.
*H04L 29/06* (2006.01)
*H04L 9/00* (2022.01)
(Continued)

(52) U.S. Cl.
CPC .......... *H04L 63/101* (2013.01); *H04L 9/3231* (2013.01); *H04L 9/3263* (2013.01);
(Continued)

(58) Field of Classification Search
CPC ... H04L 63/101; H04L 9/3263; H04L 9/3231; H04L 9/50; H04L 2463/103; H04L 63/0823
See application file for complete search history.

(56) References Cited

U.S. PATENT DOCUMENTS 5,649,102 A 7/1997 Yamauchi et al.
5,913,061 A 6/1999 Gupta et al.
(Continued)

FOREIGN PATENT DOCUMENTS

EP 4367841 A1 5/2024
WO 2016065153 A2 4/2016
(Continued)

OTHER PUBLICATIONS

Extended European Search Report for European Application No. 22838542.3, Search completed Jun. 4, 2025, Mailed Jun. 16, 2025, 10 Pgs.

(Continued)

*Primary Examiner* — Farid Homayounmehr
*Assistant Examiner* — Judy Bazna
(74) *Attorney, Agent, or Firm* — KPPB LLP

(57) ABSTRACT

Non-fungible token (NFT) platforms in accordance with various embodiments of the invention are described. In an embodiment of the NFT platform includes storing several tokens, where a token includes several data elements and associated access control settings for accessing the several data elements; identifying a script to execute that is associated with a first token, where the script includes at least one instruction for accessing data from at least one data element of a second token; determining, based on access control settings of the second token, that the first token has particular access rights to the at least one data element of the second token; and executing the script based on the particular access rights of the first token.

19 Claims, 23 Drawing Sheets

(51) Int. Cl.
   *H04L 9/32*  (2006.01)
   *H04L 9/40*  (2022.01)
(52) U.S. Cl.
   CPC ............ *H04L 9/50* (2022.05); *H04L 63/0823* (2013.01); *H04L 2463/103* (2013.01)

(56) References Cited

U.S. PATENT DOCUMENTS

| | | | |
|---|---|---|---|
| 8,561,181 | B1 | 10/2013 | Sobel et al. |
| 9,532,246 | B2 | 12/2016 | Michl et al. |
| 9,774,578 | B1 | 9/2017 | Ateniese et al. |
| 10,263,986 | B1* | 4/2019 | Bucklew ............... G06F 21/335 |
| 10,489,388 | B1 | 11/2019 | Rogynskyy et al. |
| 10,510,073 | B2* | 12/2019 | Wong ................... G06Q 20/382 |
| 10,679,244 | B1* | 6/2020 | Bhowmick ........ G06Q 30/0248 |
| 11,188,911 | B2 | 11/2021 | Ley |
| 11,367,060 | B1 | 6/2022 | Barbashin et al. |
| 11,526,614 | B2 | 12/2022 | Fang |
| 11,562,451 | B1 | 1/2023 | Kozlowski |
| 12,067,308 | B2 | 8/2024 | Baker et al. |
| 12,099,997 | B1 | 9/2024 | Hoffberg |
| 12,380,438 | B2 | 8/2025 | Alsahnawi et al. |
| 12,430,463 | B1 | 9/2025 | Witchey et al. |
| 2007/0022196 | A1 | 1/2007 | Agrawal |
| 2012/0330843 | A1* | 12/2012 | Von Mueller .......... G06K 7/082 705/64 |
| 2014/0164251 | A1 | 6/2014 | Loh |
| 2015/0033154 | A1* | 1/2015 | Nelson ................ G06F 3/04815 715/757 |
| 2015/0172392 | A1 | 6/2015 | Jean et al. |
| 2015/0237065 | A1 | 8/2015 | Roytman et al. |
| 2015/0312246 | A1* | 10/2015 | Mattsson ............ H04L 63/0823 726/26 |
| 2016/0062821 | A1 | 3/2016 | Yoon et al. |
| 2017/0116693 | A1 | 4/2017 | Rae et al. |
| 2017/0118042 | A1 | 4/2017 | Bhattacharya et al. |
| 2018/0025157 | A1 | 1/2018 | Titonis et al. |
| 2018/0068091 | A1 | 3/2018 | Gaidar et al. |
| 2018/0115425 | A1 | 4/2018 | Dechu et al. |
| 2018/0227131 | A1 | 8/2018 | Ebrahimi et al. |
| 2018/0262510 | A1* | 9/2018 | Su ........................ G06F 21/6218 |
| 2018/0278596 | A1 | 9/2018 | Ateniese et al. |
| 2019/0034920 | A1 | 1/2019 | Nolan et al. |
| 2019/0058595 | A1 | 2/2019 | Hamasni et al. |
| 2019/0172026 | A1 | 6/2019 | Vessenes et al. |
| 2019/0229915 | A1 | 7/2019 | Digiambattista et al. |
| 2019/0303887 | A1* | 10/2019 | Wright .................. H04L 9/0861 |
| 2019/0305966 | A1 | 10/2019 | Qiu |
| 2019/0341133 | A1 | 11/2019 | Harding et al. |
| 2019/0378133 | A1 | 12/2019 | Deshpande et al. |
| 2020/0118123 | A1 | 4/2020 | Liu et al. |
| 2020/0142693 | A1 | 5/2020 | Neugschwandtner et al. |
| 2020/0184469 | A1 | 6/2020 | Austin et al. |
| 2020/0273048 | A1 | 8/2020 | Andon et al. |
| 2020/0278958 | A1 | 9/2020 | Zhang et al. |
| 2020/0285633 | A1 | 9/2020 | Zhuo et al. |
| 2020/0311698 | A1 | 10/2020 | Gardner et al. |
| 2020/0327044 | A1 | 10/2020 | Pi et al. |
| 2020/0349054 | A1 | 11/2020 | Dai et al. |
| 2020/0364212 | A1 | 11/2020 | Cho et al. |
| 2021/0035246 | A1 | 2/2021 | Schouppe et al. |
| 2021/0049281 | A1 | 2/2021 | Braghin et al. |
| 2021/0073286 | A1 | 3/2021 | Hunter |
| 2021/0082044 | A1 | 3/2021 | Sliwka et al. |
| 2021/0126794 | A1 | 4/2021 | Forrester et al. |
| 2021/0160102 | A1 | 5/2021 | Wang et al. |
| 2021/0160252 | A1 | 5/2021 | Qiu |
| 2021/0165822 | A1 | 6/2021 | Blackburn et al. |
| 2021/0166206 | A1 | 6/2021 | Moiyallah, Jr. et al. |
| 2021/0209596 | A1 | 7/2021 | Ley |
| 2021/0241273 | A1 | 8/2021 | Abad et al. |
| 2021/0248214 | A1 | 8/2021 | Goldston et al. |
| 2021/0326852 | A1 | 10/2021 | Yantis et al. |
| 2022/0012367 | A1 | 1/2022 | Ramanan et al. |
| 2022/0108232 | A1 | 4/2022 | Hardgrave et al. |
| 2022/0139566 | A1 | 5/2022 | Gardina |
| 2022/0179626 | A1 | 6/2022 | Kacherginsky |
| 2022/0198049 | A1 | 6/2022 | Dumas et al. |
| 2022/0230240 | A1 | 7/2022 | Sliwka et al. |
| 2022/0239495 | A1 | 7/2022 | Norton et al. |
| 2022/0271915 | A1* | 8/2022 | Turner .................. H04L 9/3247 |
| 2022/0309491 | A1 | 9/2022 | Shapiro et al. |
| 2022/0329446 | A1 | 10/2022 | Jackson et al. |
| 2023/0006976 | A1 | 1/2023 | Jakobsson et al. |
| 2023/0055618 | A1 | 2/2023 | Jakobsson et al. |
| 2023/0071093 | A1 | 3/2023 | Madhusudhan |
| 2023/0073140 | A1 | 3/2023 | Richter et al. |
| 2023/0073859 | A1 | 3/2023 | Matthews et al. |
| 2023/0080599 | A1 | 3/2023 | Rose et al. |
| 2023/0085481 | A1 | 3/2023 | Padmanabhan |
| 2023/0104103 | A1 | 4/2023 | Eby et al. |
| 2023/0108983 | A1 | 4/2023 | Vosseller et al. |
| 2023/0114684 | A1 | 4/2023 | Jakobsson et al. |
| 2023/0119641 | A1 | 4/2023 | Meyers et al. |
| 2023/0119691 | A1 | 4/2023 | Kurian et al. |
| 2023/0120897 | A1 | 4/2023 | Kozlowski, III |
| 2023/0123993 | A1 | 4/2023 | Meyers et al. |
| 2023/0130182 | A1 | 4/2023 | Mir et al. |
| 2023/0139878 | A1 | 5/2023 | Clark et al. |
| 2023/0162180 | A1 | 5/2023 | Deng |
| 2023/0177167 | A1 | 6/2023 | Chan et al. |
| 2023/0186281 | A1 | 6/2023 | Todasco et al. |
| 2023/0214820 | A1 | 7/2023 | Crumb et al. |
| 2023/0245102 | A1 | 8/2023 | Mistele |
| 2023/0274283 | A1 | 8/2023 | Kryvoshei et al. |
| 2023/0281606 | A1 | 9/2023 | Jakobsson et al. |
| 2023/0289724 | A1 | 9/2023 | Halbfinger et al. |
| 2023/0298001 | A1 | 9/2023 | Jethmalani et al. |
| 2023/0306543 | A1 | 9/2023 | Beaty et al. |
| 2023/0325814 | A1 | 10/2023 | Vijayan et al. |
| 2023/0351395 | A1 | 11/2023 | Anastasia et al. |
| 2023/0394455 | A1 | 12/2023 | Meyers et al. |
| 2023/0394469 | A1 | 12/2023 | Vijayan et al. |
| 2024/0007284 | A1 | 1/2024 | Osborn et al. |
| 2024/0070789 | A1 | 2/2024 | Jenson |
| 2024/0086915 | A1 | 3/2024 | Finlow-Bates |
| 2024/0289783 | A1 | 8/2024 | Alsahnawi et al. |
| 2024/0354758 | A1 | 10/2024 | Nemethi |
| 2024/0386429 | A1 | 11/2024 | Jiang et al. |
| 2025/0028790 | A1 | 1/2025 | Finlow-Bates et al. |
| 2025/0053928 | A1 | 2/2025 | Colter et al. |
| 2025/0265365 | A1 | 8/2025 | Ramesh et al. |

FOREIGN PATENT DOCUMENTS

| | | | |
|---|---|---|---|
| WO | 2021046552 | A1 | 3/2021 |
| WO | 2023283545 | A1 | 1/2023 |
| WO | 2023060284 | A1 | 4/2023 |
| WO | 2023060284 | A8 | 1/2025 |

OTHER PUBLICATIONS

International Preliminary Report on Patentability for International Application PCT/US2022/077862, Report issued Apr. 9, 2024, Mailed on Apr. 18, 2024, 7 Pgs.

International Search Report and Written Opinion for International Application No. PCT/US2022/073417, Search completed Oct. 27, 2022, Mailed Nov. 14, 2022, 17 pgs.

International Search Report and Written Opinion for International Application No. PCT/US2022/077862, Search completed Feb. 1, 2023, Mailed Mar. 3, 2023, 17 Pgs.

International Preliminary Report on Patentability for International Application PCT/US2022/073417, Report issued Dec. 14, 2023, Mailed on Jan. 18, 2024, 08 Pgs.

Boneh et al., "Identity-Based Encryption from the Weil Pairing", Siam J. of Computing, 2003, vol. 32, No. 3, pp. 586-615.

Gao et al., "Physical unclonable functions", Nat Electron 3, 81-91 (2020).

Gentry, , "Certificate-Based Encryption and the Certificate Revocation Problem", Lecture Notes in Computer Science 2656, Oct. 2003, DOI:10.1007/3-540-39200-9_17.

(56) References Cited

OTHER PUBLICATIONS

Jakobsson et al., "Fractal Merkle Tree Representation and Traversal", Efficient management of Merkle trees is disclosed in the 2003 publication.
Jakobsson et al., "Secure Remote Attestation", https://eprint.iacr.org/2018/031.pdf.
Jakobsson et al., "Server-Side Detection of Malware Infection", NSPW '09: Proceedings of the 2009 workshop on New security paradigms workshop Sep. 2009 pp. 11-22 https://doi.org/10.1145/1719030.1719033.
Korus et al., "Content Authentication for Neural Imaging Pipelines: End-to-end Optimization of Photo Provenance in Complex Distribution Channels", Proceedings of the IEEE/CVF Conference on Computer Vision and Pattern Recognition (CVPR), 2019, pp. 8621-8629.
Pappu et al., "Physical One-Way Functions", PHD Thesis, MIT, 2001.
Pappu et al., "Physical One-Way functions", Science. 297 (5589): 2026-2030.
Shamsoshoara et al., "A survey on physical unclonable function (PUF)-based security solutions for Internet of Things", Computer Networks, vol. 183, 2020.
Tuyls et al., "Read-proof hardware from protective coatings", CHES 2006, pp. 369-383.
Alkadi et al., "A Review of Intrusion Detection and Blockchain Applications in the Cloud: Approaches, Challenges and Solutions", IEEE Access, vol. 8, Jun. 3, 2020, pp. 104893-104917, doi: 10.1109/ACCESS.2020.2999715.

\* cited by examiner

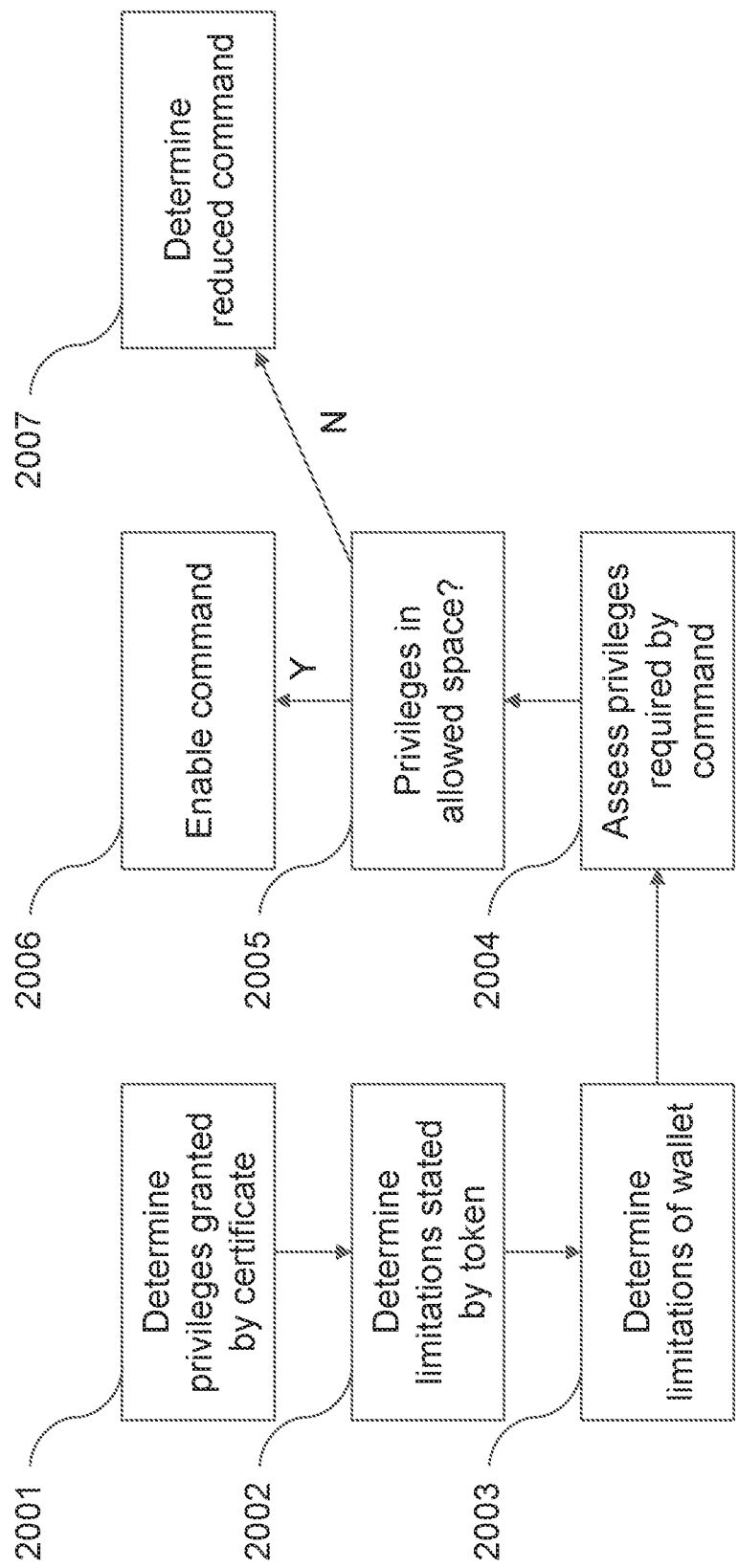

SYSTEMS AND METHODS FOR PROTECTING AGAINST TOKEN-BASED MALICIOUS SCRIPTS

CROSS-REFERENCE TO RELATED APPLICATION

This application claims benefit of and priority under 35 U.S.C. 119(e) to U.S. Provisional Patent Application No. 63/270,092 entitled "Protection Against Token-Based Malicious Scripts" by Jakobsson, filed Oct. 21, 2021, the disclosure of which is hereby incorporated by reference in its entirety for all purposes.

FIELD OF THE INVENTION

This invention relates to tokens including non-fungible tokens (NFTs) in distributed and tokenized environments. In particular, to environments that provide protection against token-based malicious scripts.

BACKGROUND

The emergence of Non-Fungible Token (NFT) marketplaces has allowed content creators (e.g., artists, musicians, among others) to reach buyers. Furthermore, the trading of NFTs is becoming increasingly common. In particular, an NFT may be used for assigning a digital representation of ownership for digital items, such as images, but also other physical items. As NFTs become increasingly complex, it can be increasingly difficult to protect against potential abuses, including protecting against malicious scripts.

In particular, tokens may be able to initiate the execution of scripts running in end-user execution environments, such as user digital wallets. Being able to support such functionality can provide beneficial functionality. However, the added functionality can be susceptible to malicious attacks unless systems include protection mechanisms that can withstand the potential abuse. Such scripts may be carried by malicious NFTs. They can be referenced by NFTs, whether with the knowledge of an NFT creator or not. For example, a hosting service for scripts may be breached, and the stored scripts modified, thereby impacting the functionality of the tokens referencing the scripts, that can result in potential harm. Malicious execution may also be a result of buffer overflow attacks, where scripts may execute only selected portions such as in a return-oriented programming (ROP) attack. Protection against malicious scripts can be different from the protection against general malware due to differences in execution environments and availability of scripts and interconnectivity in token-based environments. Furthermore, the potential financial rewards reaped by attackers can be substantial, creating enticements for abuse and increasing the bar for protection, particularly with the inclusion of anonymously exchanged cryptocurrency that is often held within a same digital wallet.

SUMMARY OF THE INVENTION

Systems and methods for providing security features in distributed and tokenized environments in accordance with various embodiments of the invention are described. One embodiments includes a method of processing non-fungible tokens (NFTs) in an NFT platform, including: a network interface; memory; and at least one processor executing on at least one computing unit from a plurality of computing units in a distributed computing environment, wherein a processor is configured to: store a plurality of tokens, wherein a token comprises a plurality of data elements and associated access control settings for accessing the plurality of data elements; identify a script to execute that is associated with a first token, wherein the script comprises at least one instruction for accessing data from at least one data element of a second token; determine, based on access control settings of the second token, that the first token has particular access rights to the at least one data element of the second token; and execute the script based on the particular access rights of the first token.

In a further embodiment, the script comprises obtaining the data from the at least one data element of the second token and providing the data to the first token.

In a further embodiment, the execution of the script comprises executing the at least one instruction.

In a further embodiment, the execution of the script comprises executing a modification of the at least one instruction.

In a further embodiment, the execution of the script comprises conveying a message to an entity indicated by the at least one instruction.

In a further embodiment, the execution of the script based on the particular access rights comprises blocking the script from executing when the particular access rights of the first token to the second token do not meet a requirement associated with the second token.

In a further embodiment, the execution of the script based on the particular access rights comprises blocking the script from executing when the particular access rights of the first token to the second token do not meet a requirement associated with the execution environment.

In a further embodiment, the NFT platform is configured to: analyze an access control list to determine access control settings of the second token, wherein the access control list provides access control settings for a plurality of tokens.

In a further embodiment, the NFT platform is configured to analyze a certificate associated with the second token to determine access control settings of the second token, wherein the certificate is generated by an external service provider.

In a further embodiment, for a particular token, access control settings specify access rights for at least one other token to the particular token, including permitted and restricted access and types of access to data elements of the particular token.

In a further embodiment, a type of access is at least one access type selected from the group consisting of: read access, write access, and access to initiate execution of a process on a particular token.

In a further embodiment, the token is a non-fungible token (NFT).

In a further embodiment, the first token comprises the script.

In a further embodiment, an entity external to the first token stores the script.

In a further embodiment, the at least one instruction causes the detection of the second token.

In a further embodiment, the at least one instruction performs a computation on data that is part of the second token.

In a further embodiment, the at least one instruction causes the execution of a script associated with the second token.

In a further embodiment, the at least one instruction performs a computation on state data associated with the second token.

In a further embodiment, access control settings of a particular token are expressed at least in part by a certificate associated with the particular token.

In a further embodiment, access control settings between a plurality of tokens are based on a similarity between the plurality of token.

In a further embodiment, access control settings of a particular token are based on the execution environment.

In a further embodiment, the execution environment comprises a wallet.

In a further embodiment, the execution environment is a trusted execution environment (TEE).

Another embodiment includes a method for performing execution of a script, including: determining, using an execution environment of an NFT platform, a script associated with a first token, where the script comprises at least one instruction for accessing information related to a second token, determining, using the execution environment of the NFT platform, the access rights of the first token to the second token; executing, using the execution environment of the NFT platform, the at least one instruction based on the access rights.

In a further embodiment, the token is a non-fungible token (NFT).

In a further embodiment, the first token comprises the script.

In a further embodiment, an entity external to the token stores the script.

In a further embodiment, the at least one instruction causes the detection of the second token.

In a further embodiment, the at least one instruction performs a computation on content that is part of the second token.

In a further embodiment, the at least one instruction causes the execution of a script associated with the second token.

In a further embodiment, the at least one instruction performs a computation on state data associated with the second token.

In a further embodiment, the access rights are expressed at least in part by a certificate associated with the second token.

In a further embodiment, the access rights are based on a similarity between the first token and the second token.

In a further embodiment, the access rights are based on the execution environment.

In a further embodiment, the evaluation of the at least one instruction results in the execution of the at least one instruction.

In a further embodiment, the execution of the instruction comprises a modification of the at least one instruction.

In a further embodiment, the execution of the at least one instruction causes data to be provided to the first token, the data being based on the result of the execution.

In a further embodiment, the execution of the at least one instruction results in the conveyance of a message to an entity indicated by the at least one instruction.

In a further embodiment, access rights of the first token to the second token do not meet a requirement associated with the second token and the script is prevented from executing.

In a further embodiment, the access rights of the first token to the second token do not meet a requirement associated with the execution environment and the script is prevented from executing.

In a further embodiment, the execution environment comprises a wallet.

In a further embodiment, the execution environment is a trusted execution environment (TEE).

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 20 illustrates a process for determining whether a requested action requested by or on behalf of a first token is permissible in accordance with an embodiment of the invention.

DETAILED DESCRIPTION

Figure 1:
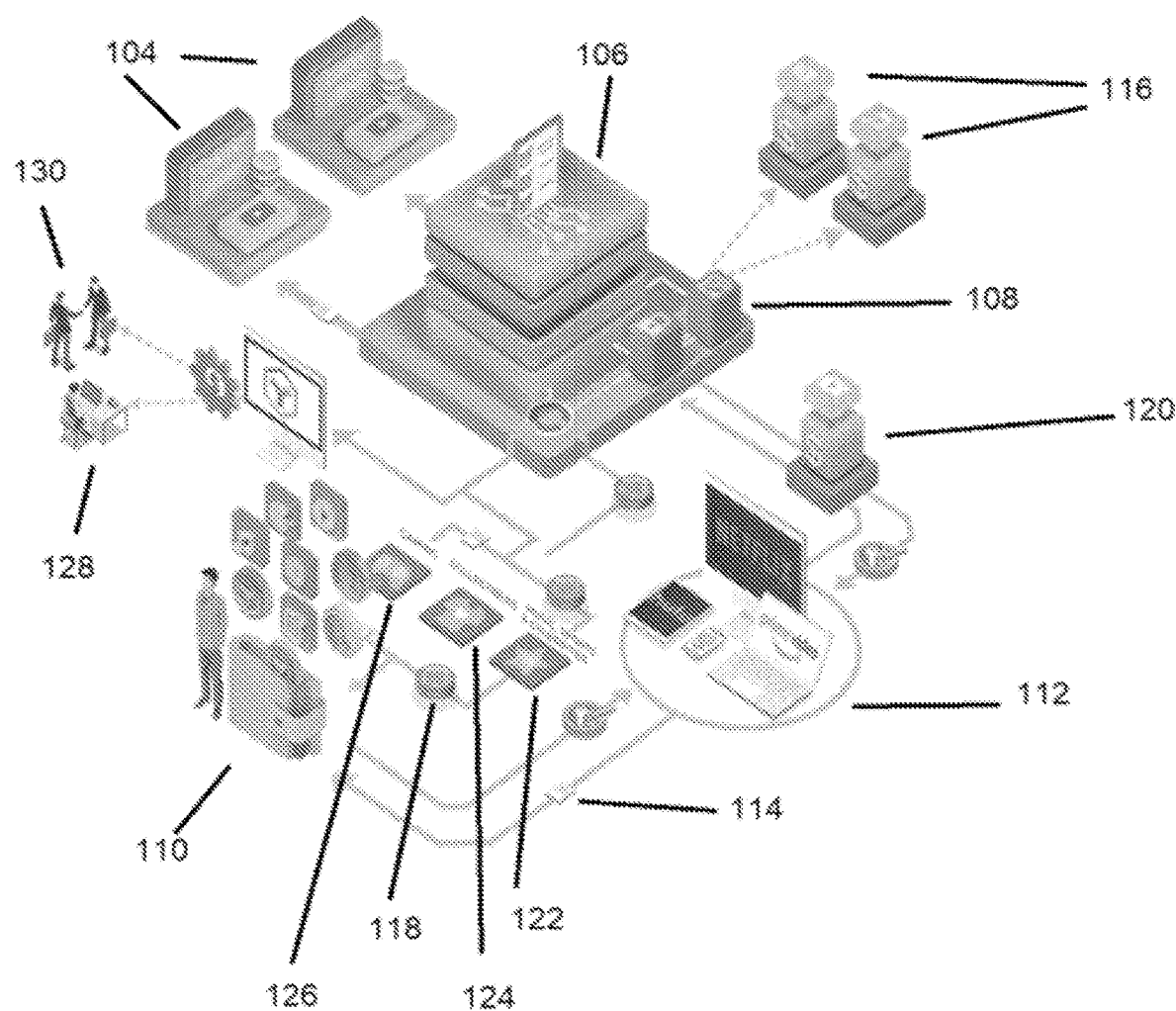
FIG. 1 is a conceptual diagram of an NFT platform in accordance with an embodiment of the invention.

Turning now to the drawings, systems and methods for implementing blockchain-based Non-Fungible Token (NFT)

that can generate conditional tokens in accordance with various embodiments of the invention are illustrated. In several embodiments, a blockchain-based NFT security platform is provided that generates NFTs that enable content creators to issue, mint, and/or transfer NFTs that can include different data elements that can specify different access control settings, including permitted and/or restricted data that can be accessible by other NFTs.

NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFT platforms in accordance with many embodiments provide protection against various different types of malicious script-based abuses that can be introduced in token-based environments. NFT platforms can include different execution environments that facilitate the storage and usage of tokens, including digital wallets and/or digital wallet applications, digital rights management (DRM) systems that can include secure software and/or hardware, secure execution environments such as TrustZone among others that can provide security assurances using secure boot processes. NFT platforms in accordance with many embodiments can include software and/or hardware configurations that protect an execution environment against potential abuses.

NFT platforms in accordance with many embodiments of the invention provide protection against malicious scripts by configuring an execution environment that includes a partition of separate secure storages compartments (e.g., sandboxes) for storing elements including tokens, and different tokens with different access restrictions can be allocated to different secure storages compartments. An NFT platform can include a secure manager module that can use a restricted interface to provide access to the different secure storage areas within an execution environment and to the particular set of tokens and associated token data stored therein. A restricted interface can include a restricted application programming interface (API) and/or a physically constrained interface. In many embodiments, a secure manager module can control which tokens are permitted and/or restricted from access to tokens and associated data stored within the different secure storage areas of an execution environment of an NFT platform.

In many embodiments, a token can be configured to include several data elements, each data element providing a particular type of data, where the type of data can include a media file (e.g., movie, audio, images, text, among many other types of media) state data (e.g., user IDs, timestamps, transactions, royalties, among many other types of state related data), and/or metadata. In many embodiments, a data element of a token can include an access control setting that provides a policy regarding access to the data element by other entities requesting access to the data, including other tokens and/or processes that seek to perform computations on the data.

NFT platforms in accordance with many embodiments can include a restricted interface that can control access between tokens. In many embodiments, a restricted interface can facilitate access control restrictions, including controlling permitted and unpermitted/restricted types of access that can occur between tokens, including the extent to which different tokens can interact with each other, the types of data and/or particular data elements of a token that can be accessed, among various other policies that can be set for tokens. Different types of access can be specified between tokens, where the types of access can include read access (e.g., being able to view data and/or retrieve data), write access (e.g., being able to modify data, delete data, add data, etc.), and initiate execution of a function on a token (e.g., an ability of a token to initiate an execution of a process on another token, including execution of a function and/or script and/or including using data associated with a token to perform computations), among other types of access that may be specified as appropriate to the requirements of specific applications.

In certain embodiments, an NFT platform can include a restricted interface that can restrict certain unpermitted types of access for a token, thus providing protection ensuring that no unpermitted types of accesses are performed on the token. For different tokens with different access control settings, certain types of access may be permitted while other types of access may be restricted/unpermitted. In many embodiments, restricted types of access may protect against malicious attacks, including malicious script based attacks.

In particular, an unpermitted and potentially dangerous type of attack using access for a token may correspond to a branching into an executable segment at a position that is not intended (e.g., as intended by a software developer) to be a starting point for execution. The use of similar types of dangerous branches can be a common technique used in malicious attacks involving return-oriented programming (ROP). Accordingly, NFT platforms in accordance with many embodiments can include a restricted interface that can limit a capability of a bad-actor to perform ROP-based malicious attacks, as the restricted interface would not allow a bad-actor to access information related to code positions and thus the bad-actor would not be able to utilize a provided interfaces, namely the restricted interface, to branch to disallowed code positions. Accordingly, NFT platforms in accordance with many embodiments can include a restricted interface that restricts information related to code positions, and that may otherwise be used by a bad-actor to perform ROP-based attacked. In many embodiments, a restricted interface can control the data that is being transmitted to and/or obtained from an executable element associated with a token. In many embodiments of the NFT platforms, the restricted interface can control data including data related to tokens that utilize external code libraries, and the restricted interface can control and limit access to external code libraries.

NFT platform can include a configuration of an execution environment partitioned with several secure storage compartments (e.g., sandboxes). A digital wallet can include a first secure storage compartment storing a set of tokens and a second secure storage compartment storing a different set of tokens, where first compartment includes a first token and a second token, and where the second compartment includes a third token. First compartment and second compartment may correspond to separate sandboxes of wallet. Each storage compartment can provide a particular set of access control settings for tokens stored within the compartment. Tokens within the different storage compartments can provide different access settings, including a first set of access settings for tokens stored in a same storage compartment, and a second set of access settings for tokens stored in a different storage compartment. In many embodiments, tokens within a same particular storage compartment may have direct access to other tokens within the same particular storage compartment (e.g., sandbox). In certain embodiments, tokens within different storage compartments may access data from each other only via a restrictive interface, where the restrictive interface can determine and control the access and/or data transferred between tokens. Accordingly, tokens within a same storage compartment may provide less restrictions for accessing data from other tokens in the same storage compartment while tokens requesting data from other tokens stored in different storage compartments may face more restrictions for accessing each other's data. In many embodiments, different storage compartments can include different access control restrictions, where a first storage compartment may provide less restrictions for accessing tokens stored in the first storage compartment, and a second storage compartment may provide more security and restrictions for tokens stored within the second storage compartment. Accordingly, different levels of security can be provided to different tokens based on the particular storage compartment to which the tokens are allocated. In certain embodiments, tokens within a same storage compartment can each have different access control settings.

Non-Fungible Token (NFT) Platforms

Turning now to the drawings, systems and methods for implementing blockchain-based Non-Fungible Token (NFT) platforms in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g. one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g. transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger. In many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users can be content creators that are vetted by an administrator of networks that may be responsible for deploying and maintaining the NFT blockchain. Once the NFTs are minted, users can obtain and conduct transactions with the NFTs. In several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. The media wallet application could also be provided by a browser, or by a dedicated hardware unit executing instructions provided by a wallet manufacturer. The different types of wallets may have slightly different security profiles and may offer different features, but would all be able to be used to initiate the change of ownership of tokens, such as NFTs. In many embodiments, the fungible tokens can be fully converted into fiat currency and/or other cryptocurrency. In several embodiments, the fungible tokens are implemented using split blockchain models in which the fungible tokens can be issued to multiple blockchains (e.g. Ethereum). As can readily be appreciated, the fungible tokens and/or NFTs utilized within an NFT platform in accordance with various embodiments of the invention are largely dependent upon the requirements of a given application.

In several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users. In addition, content creators can directly issue NFTs to the media wallets of specific users (e.g. by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the user. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications can request authentication of the NFT directly based upon the public key of the content creator and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platforms Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned blockchains are closed systems that are limited to publicly inaccessible transactions. In many embodiments, the permissioned blockchain can be in the form of distributed ledgers, while the blockchain may alternatively be centralized in a single entity.

Figure 2:
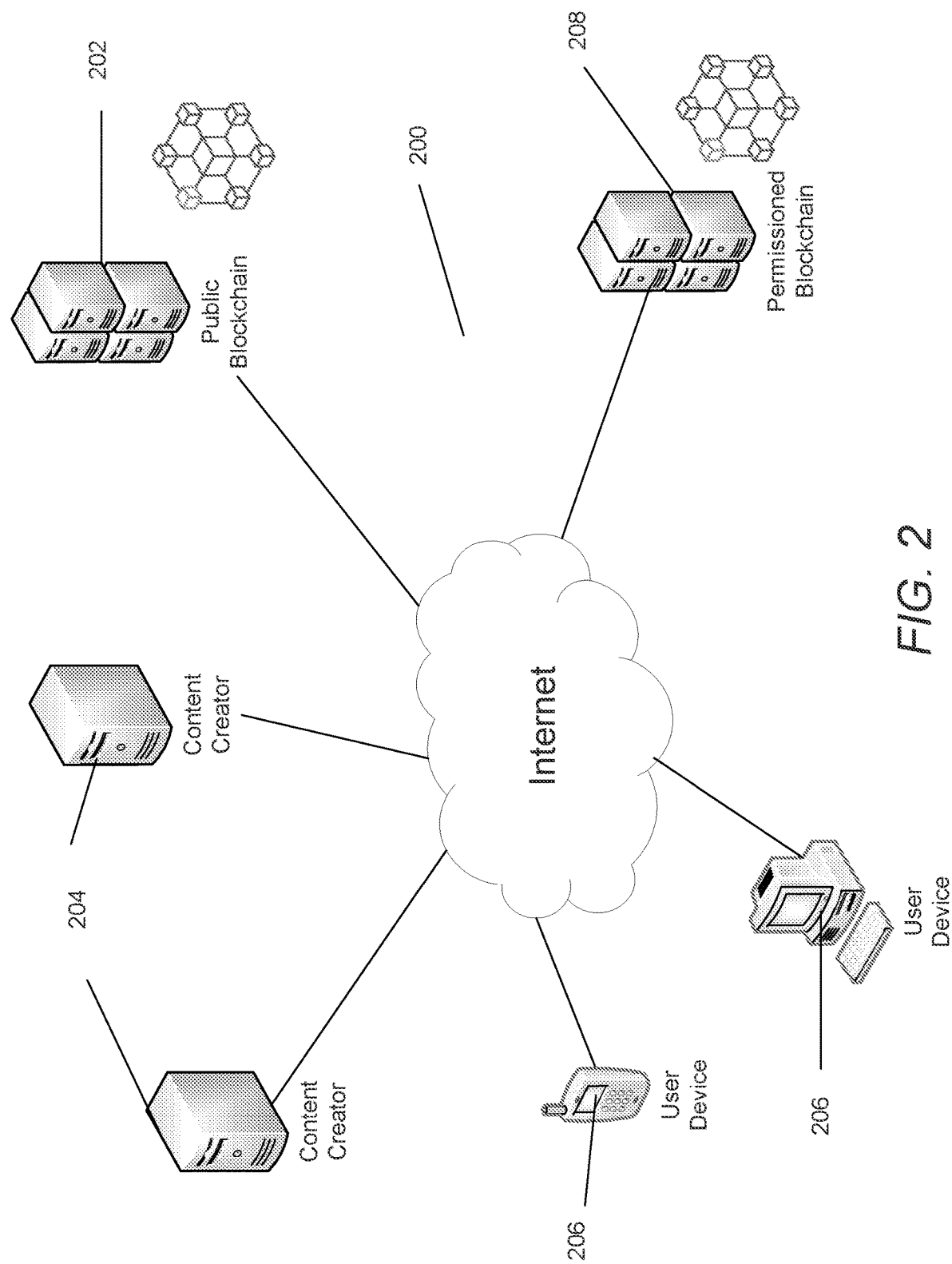
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public blockchain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In many embodiments, media wallets are smart device enabled, front-end applications for fans and/or consumers, central to all user activity on an NFT platform. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data can be accessed by the media wallet application. In this way, users control access to entries in the permissioned blockchain 208 describing the user's NFT transaction. In several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In several embodiments, the permissioned blockchain 208 supports access control lists and users can utilize a media wallet application to modify permissions granted by way of the access control list. In many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the permissioned blockchain. In several embodiments, the access to the data is determined by computer systems that implement permission-based data access services.

In many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
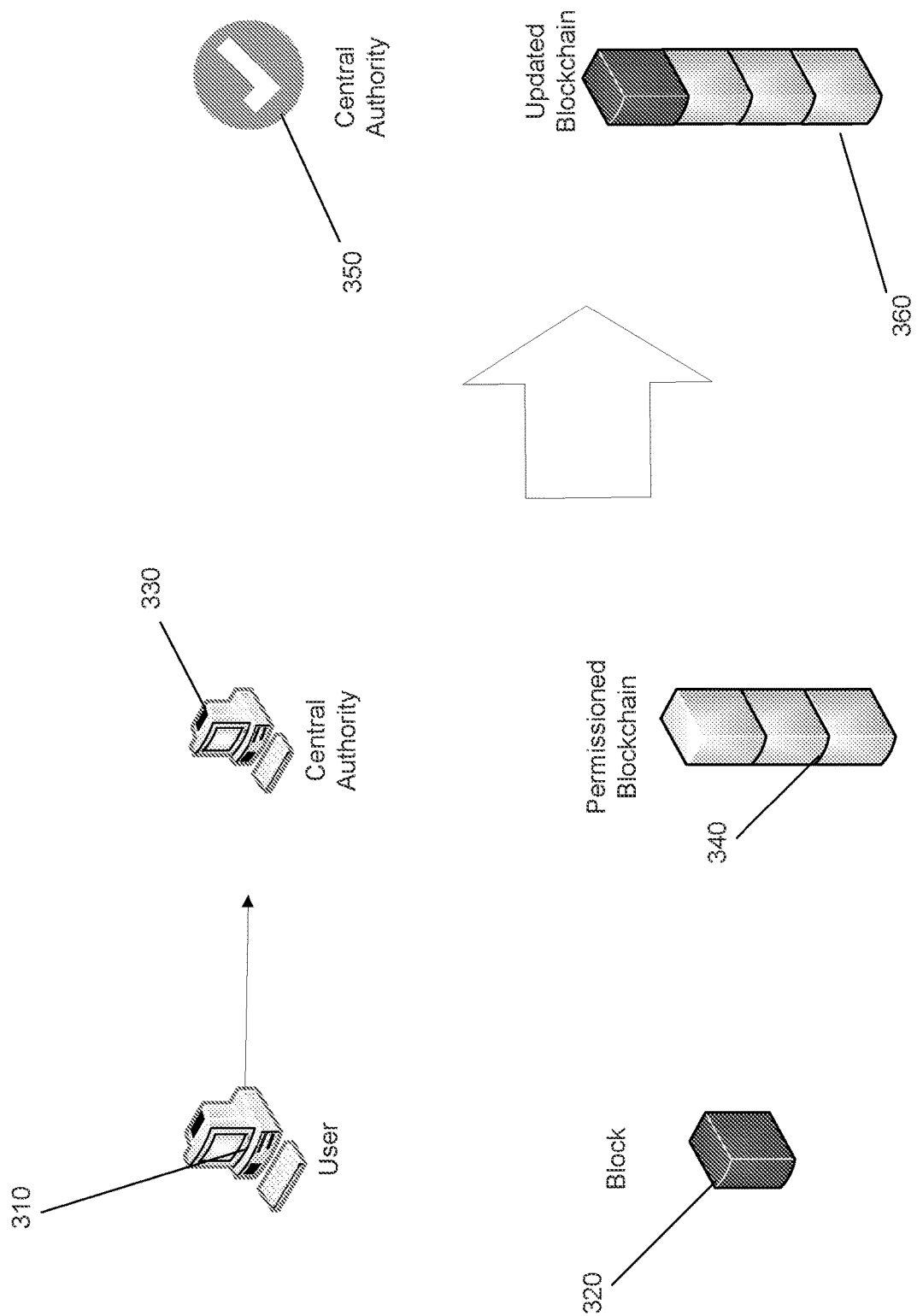
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

Figure 4:
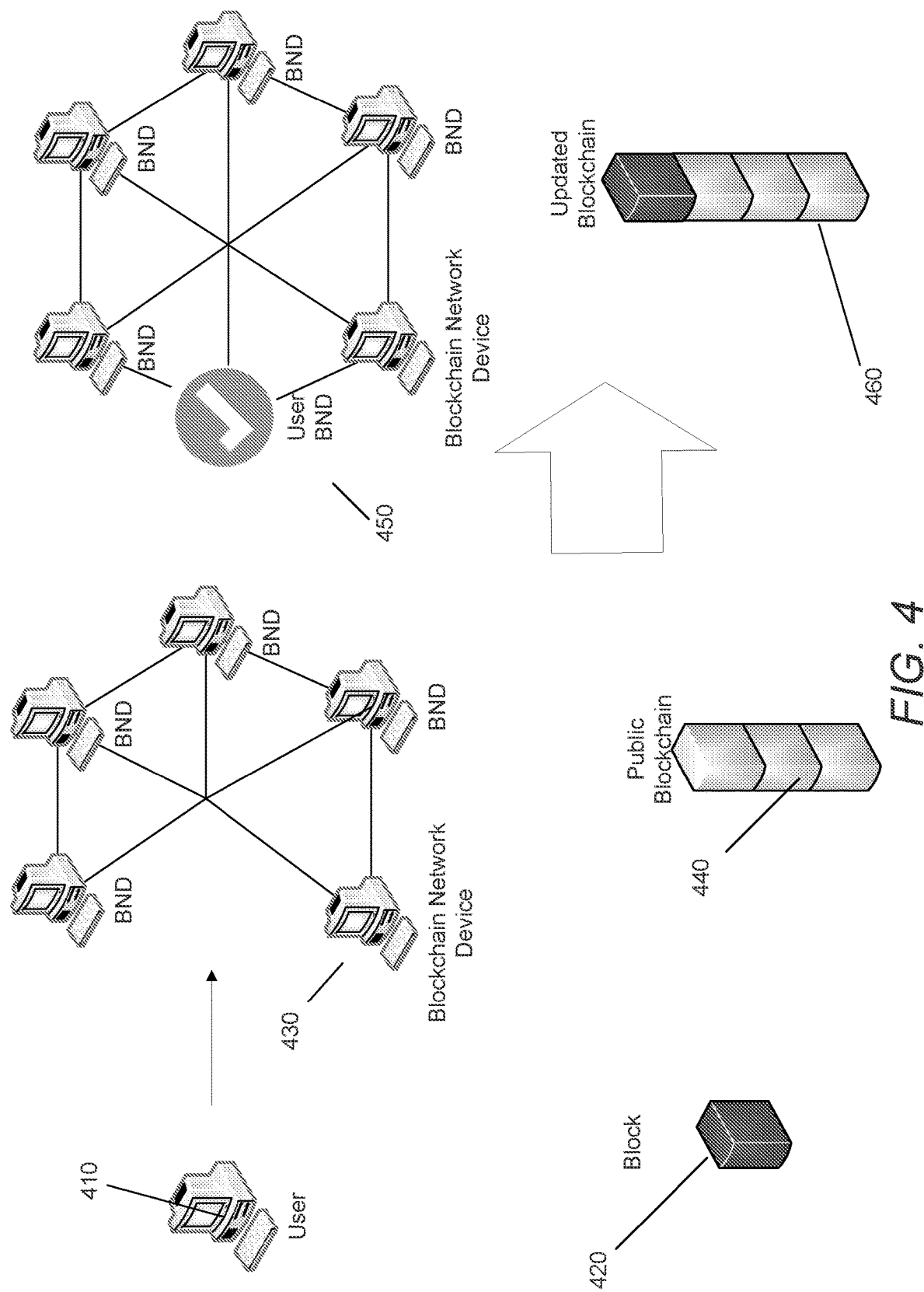
FIG. 4 is a conceptual diagram of a permission-less blockchain in accordance with an embodiment of the invention.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In many decentralized blockchains, many blockchain network devices 430, in the decentralized system may have copies of the blockchain, allowing the ability to validate transactions. In many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, Proof of Stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
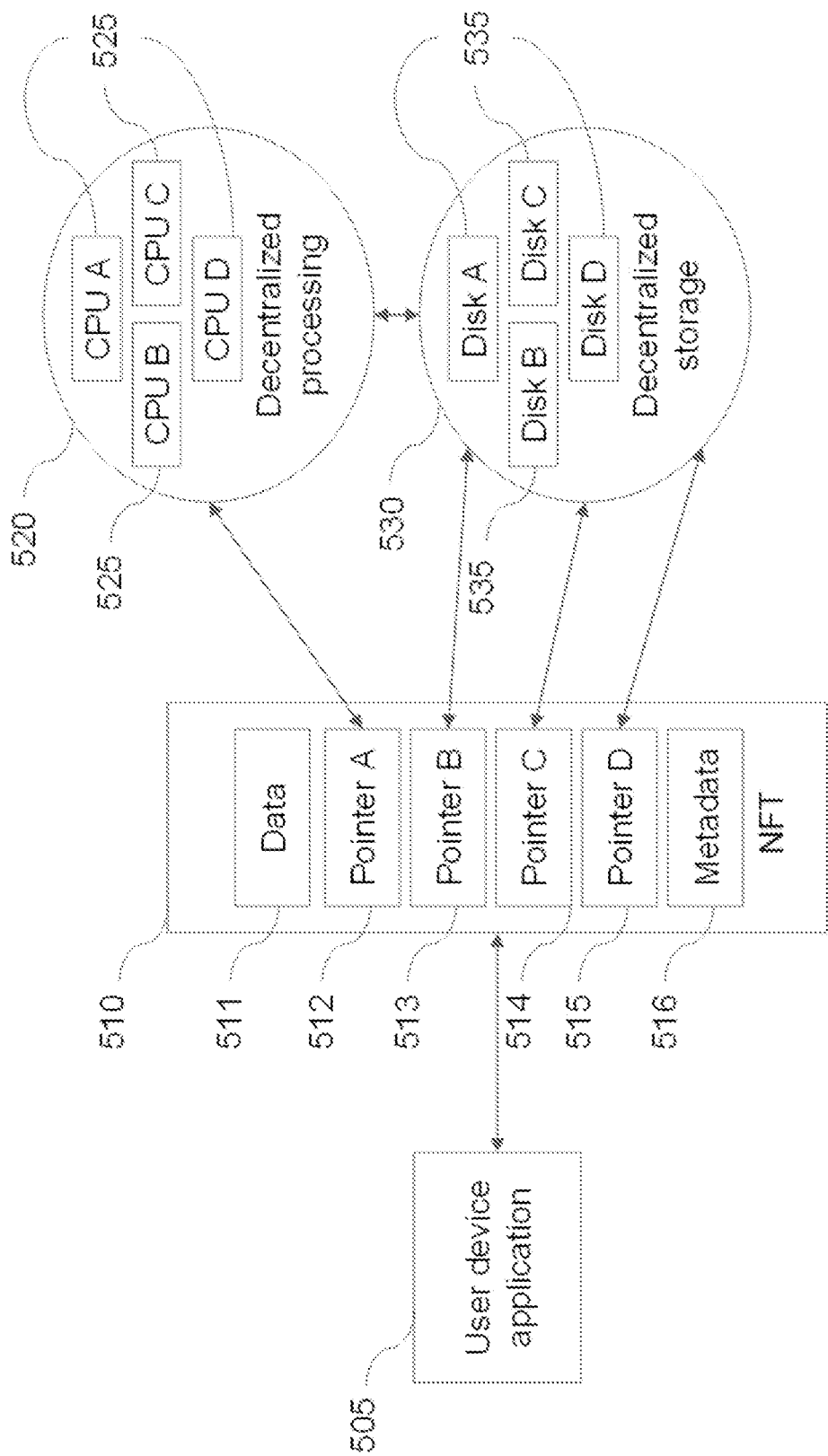
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g. URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
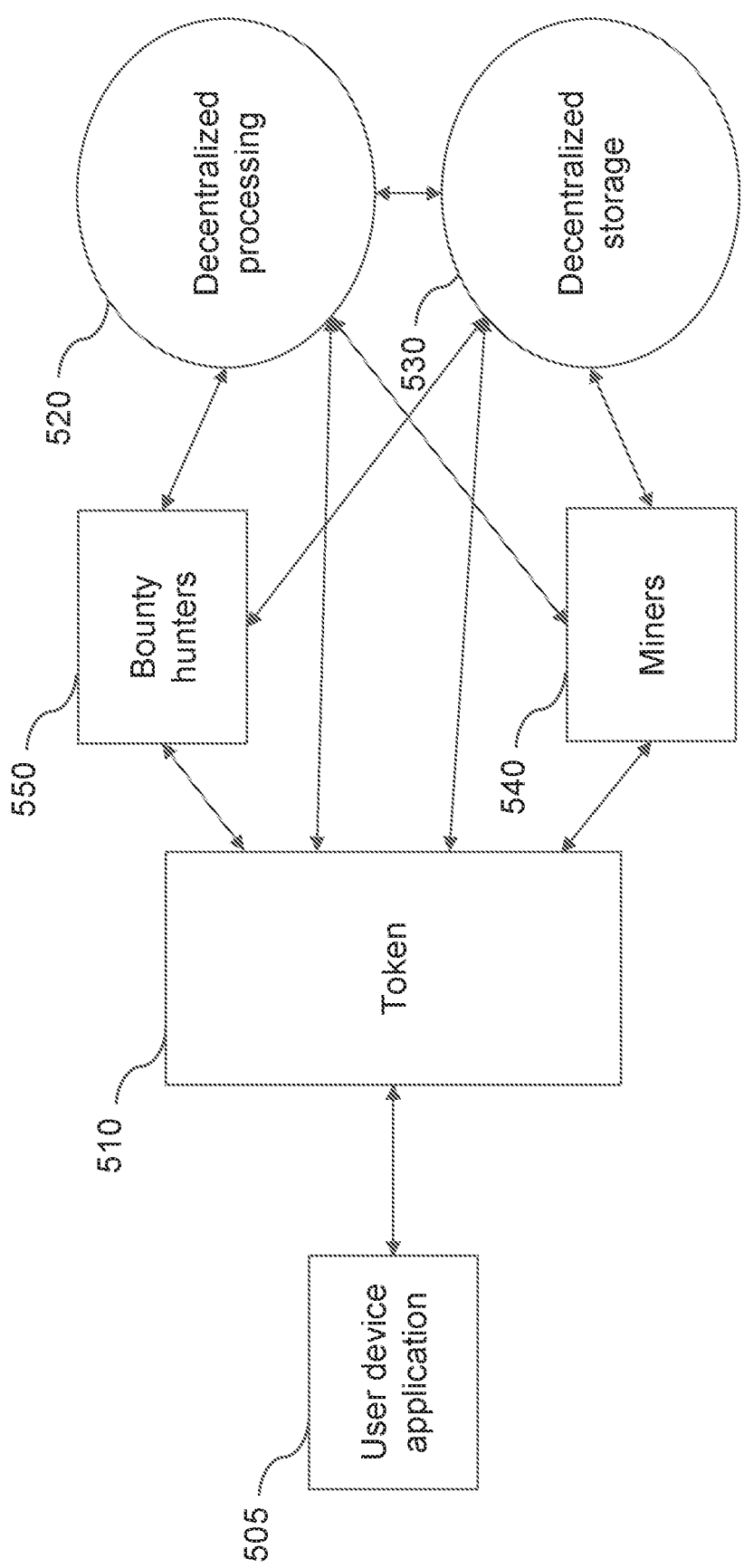

Dual blockchains may additionally incorporate methods for detection of abuse, essentially operating as a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platforms Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (PoS) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
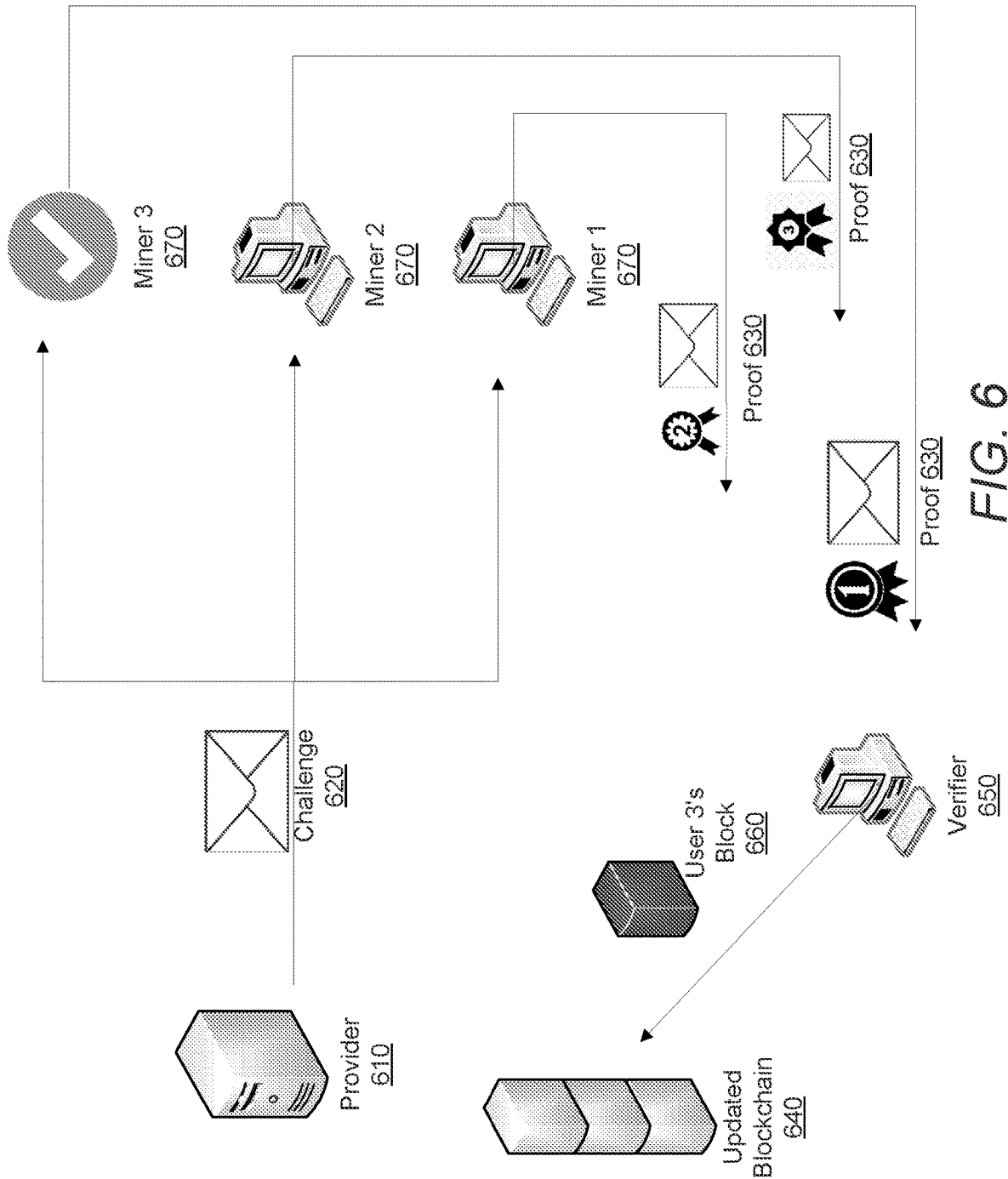
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge—response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 to the blockchain 630. As such, under a Proof of Work consensus mechanism, each miner involved can have a success probability proportional to the computational effort expended.

Figure 7:
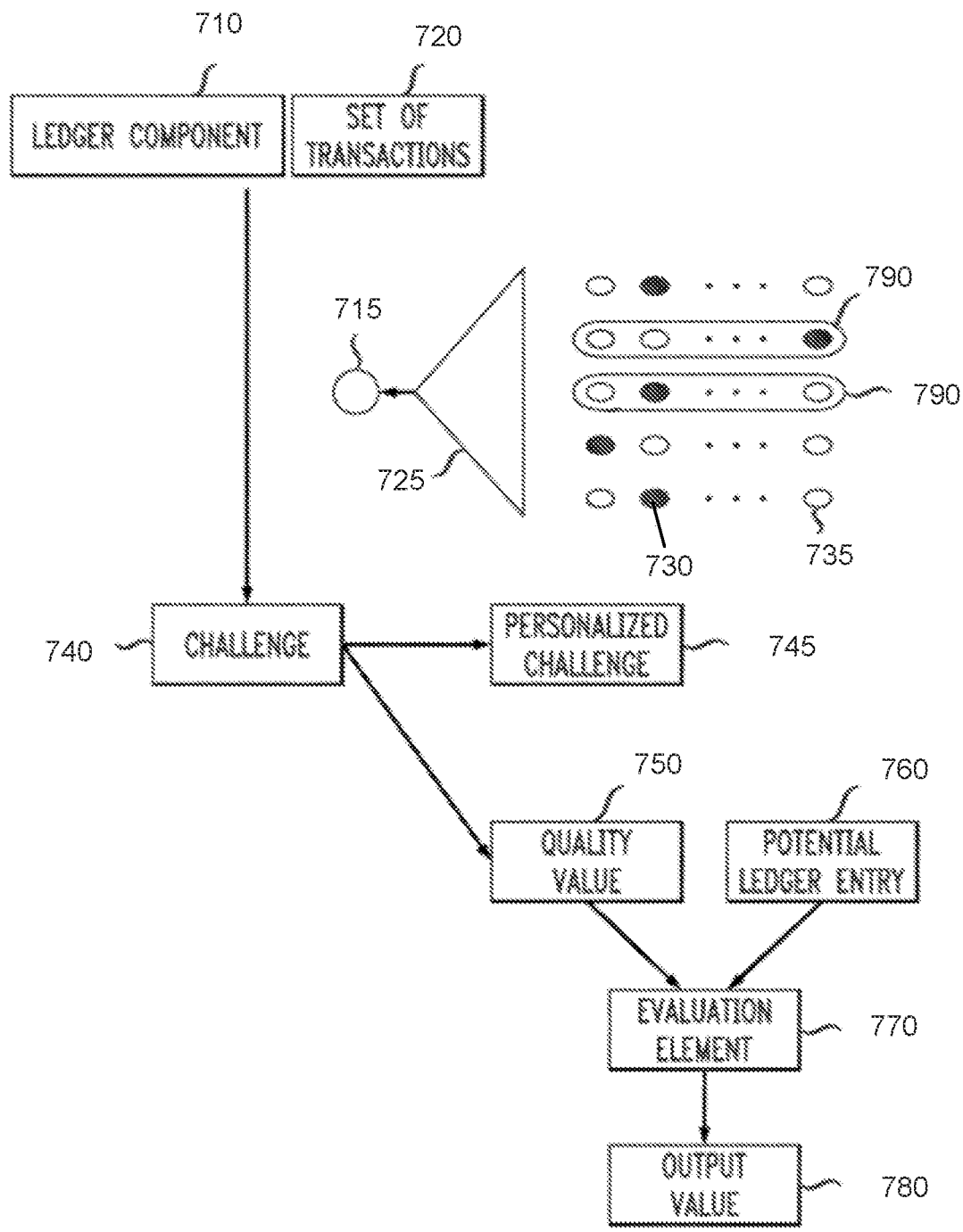
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

In some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In some embodiments, non-proportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 can also correspond to public keys. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
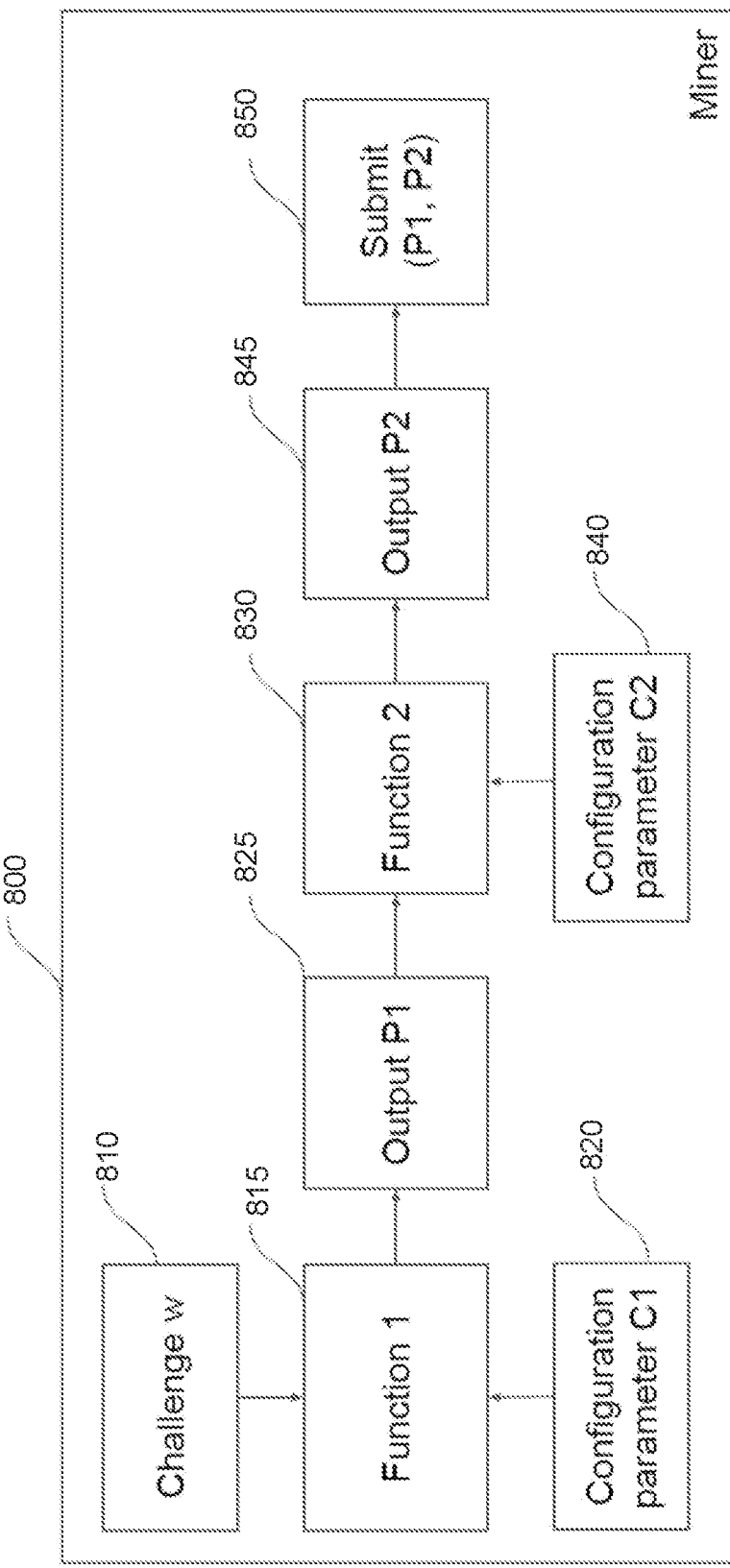
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone(™) or Intel SGX(™) may provide assurances exist of integrity by virtue of incorporating private/isolated processing environments.

Figure 9:
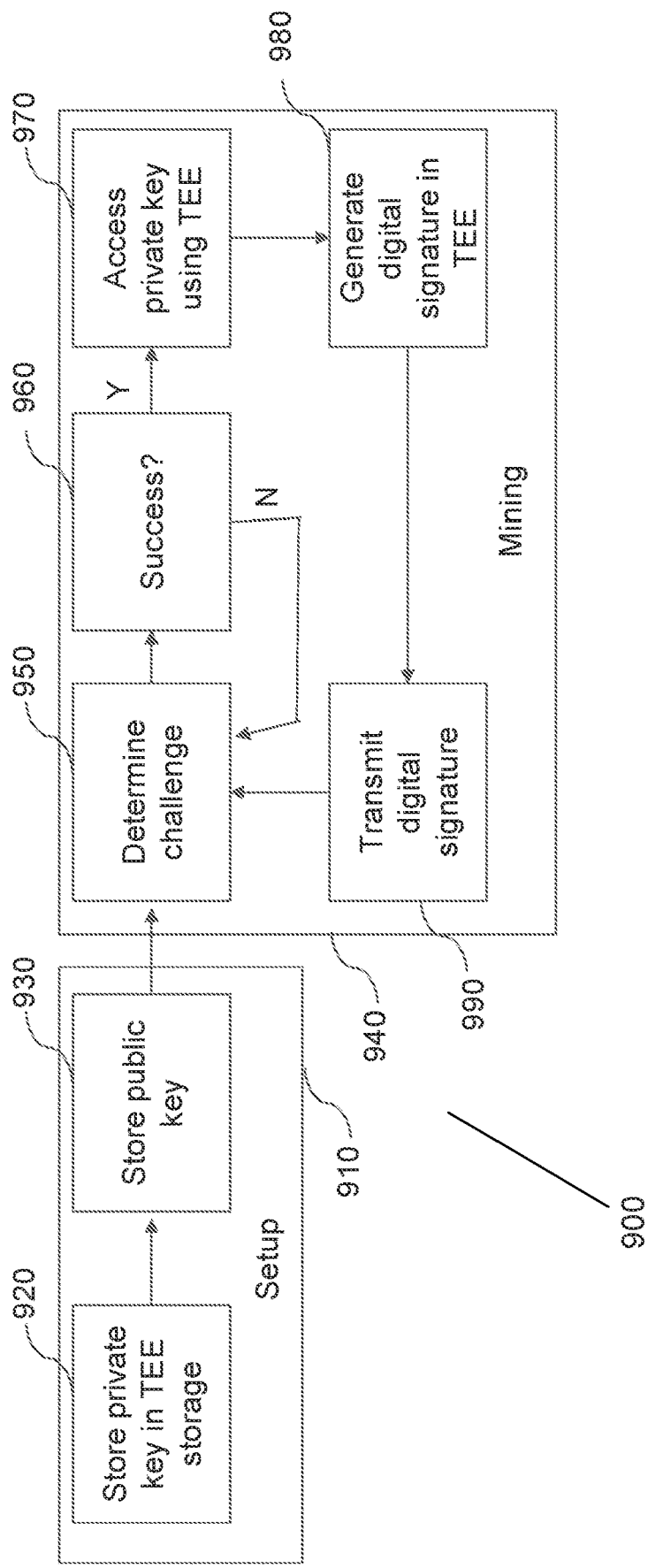
FIG. 9 illustrates a process followed by a Trusted Execution Environment-based consensus mechanism in accordance with some embodiments of the invention

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g. the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge. In this context, process 900 can determine (950) a new challenge after the ledger contents have been updated and/or a time-based observation is performed. In several embodiments the determination of a new challenge may come from any of a number of approaches appropriate to the requirements of specific applications, including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed. Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. In several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, Proof of Stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

NFT Platforms Constituent Devices and Applications

A variety of computer systems that can be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
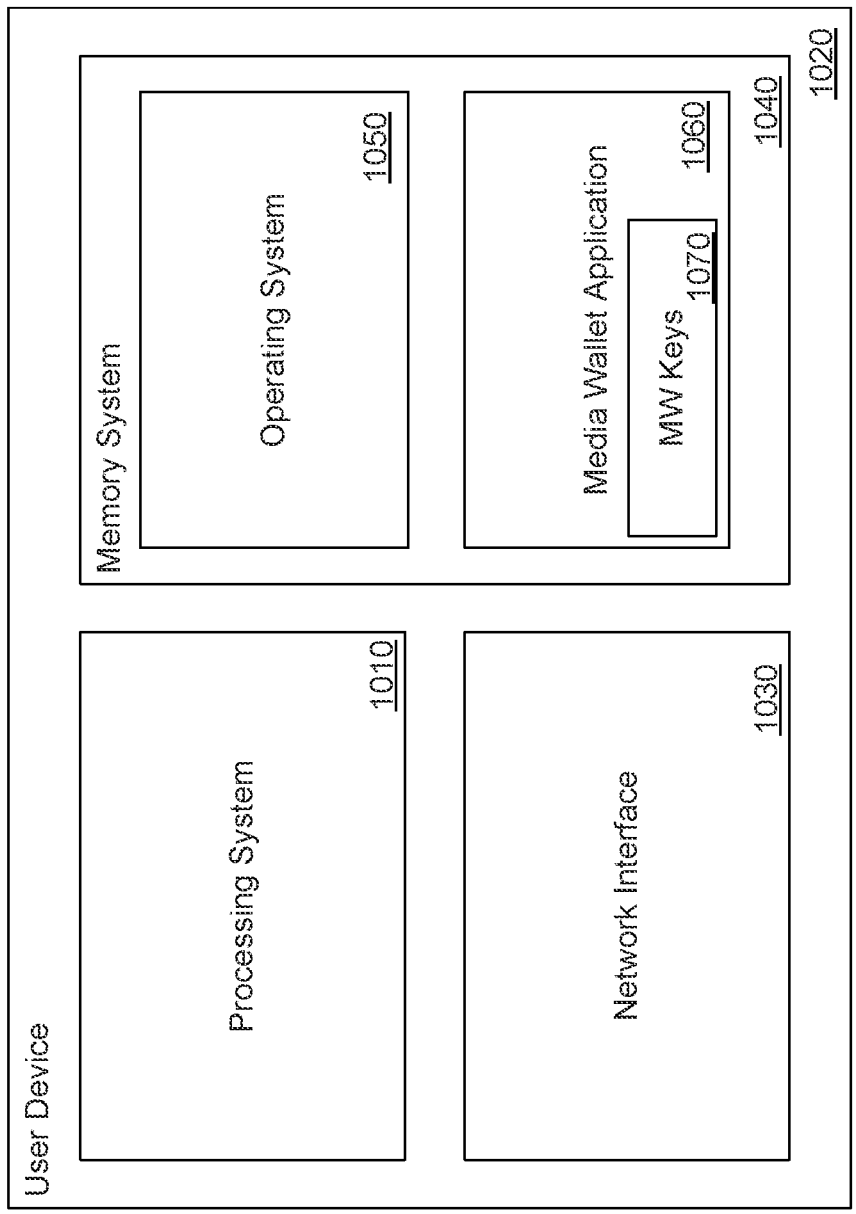
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
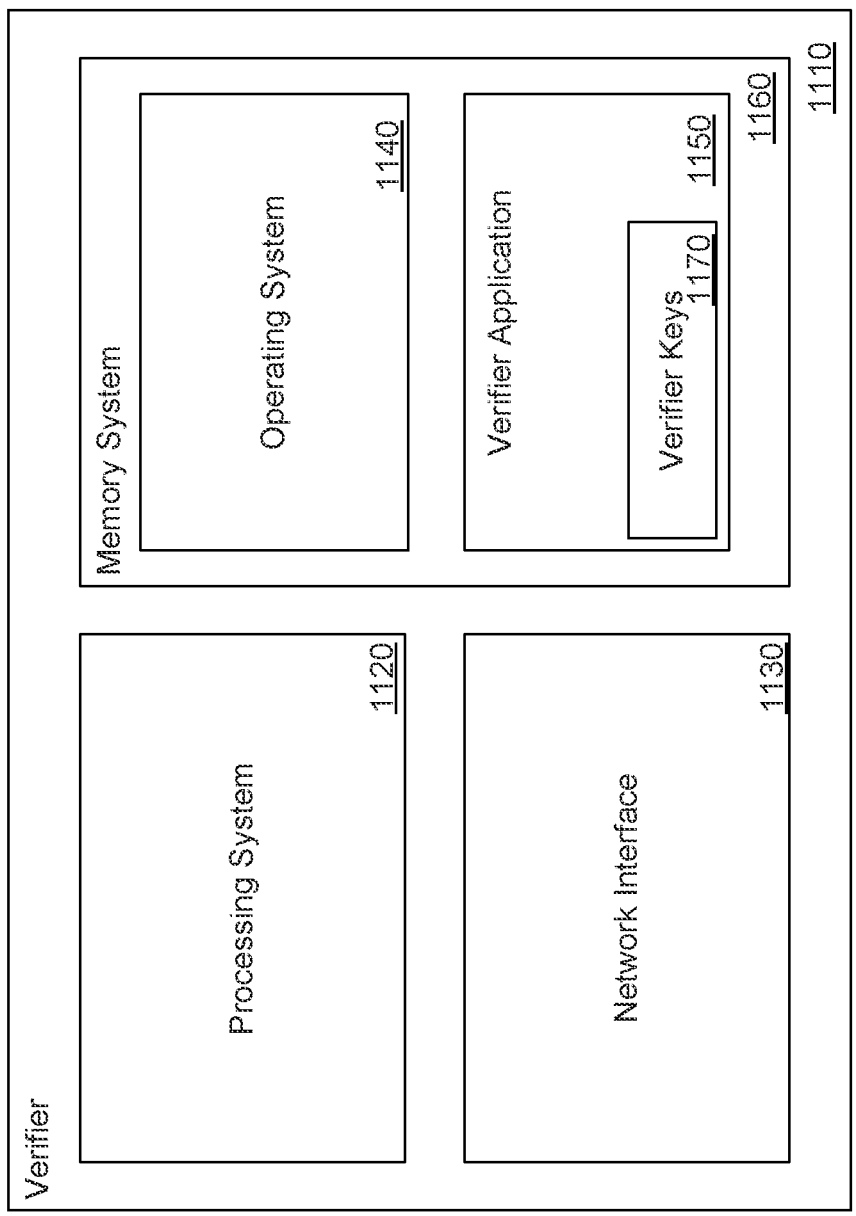

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
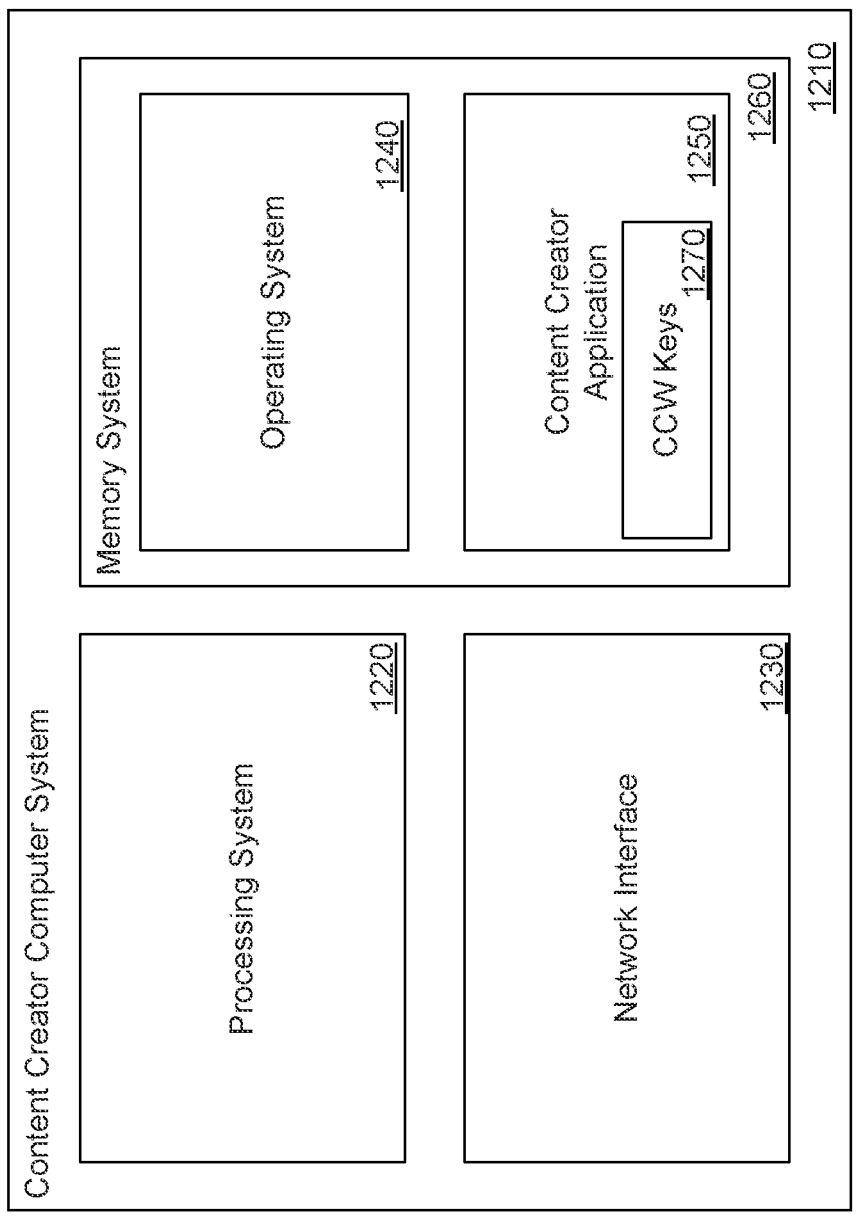

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but are not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to peruse the content; whether they can place bids to purchase the content; whether they can borrow the content, and/or whether they are biometrically authenticated.

Figure 13:
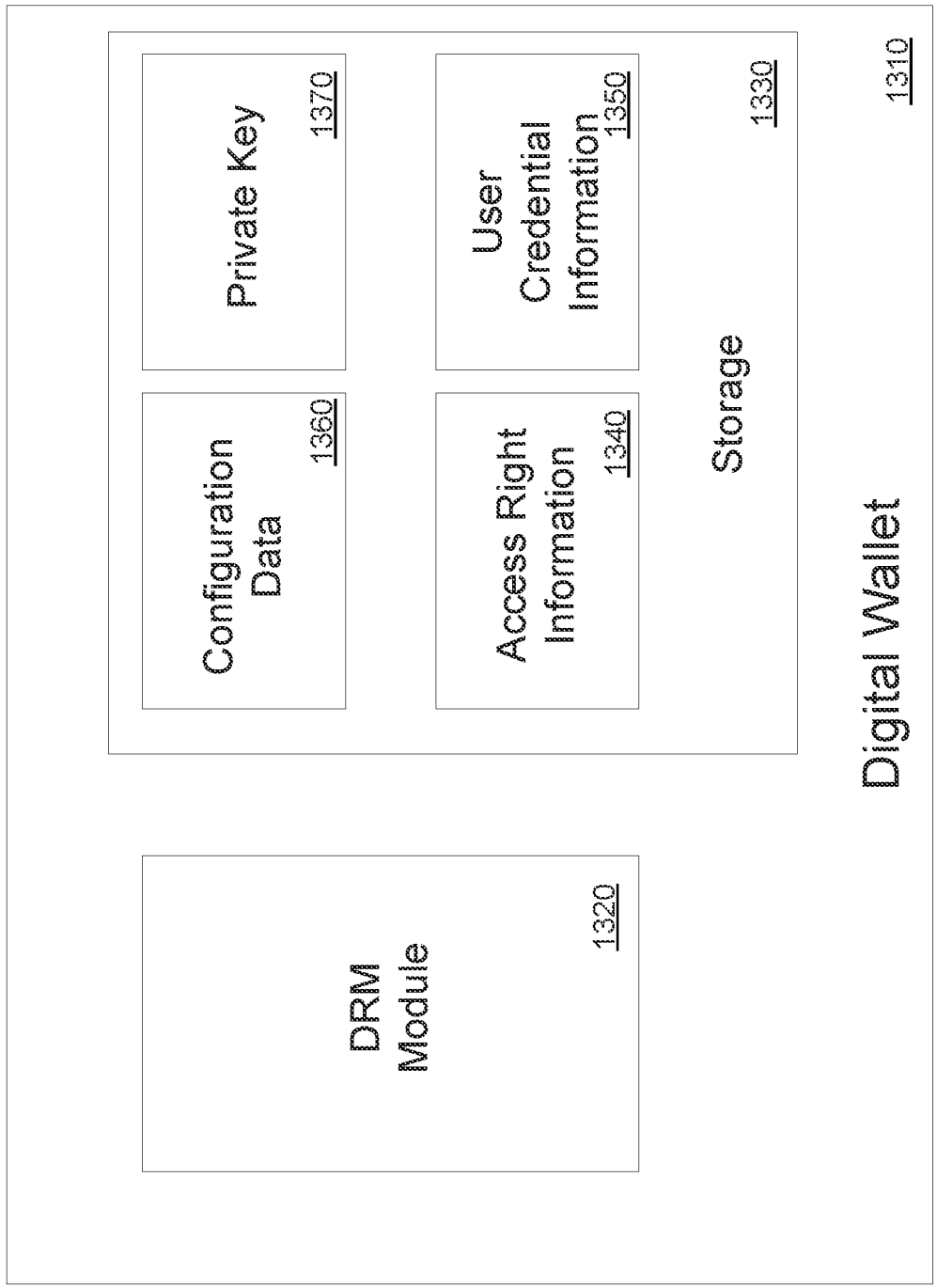
FIGS. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310. In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
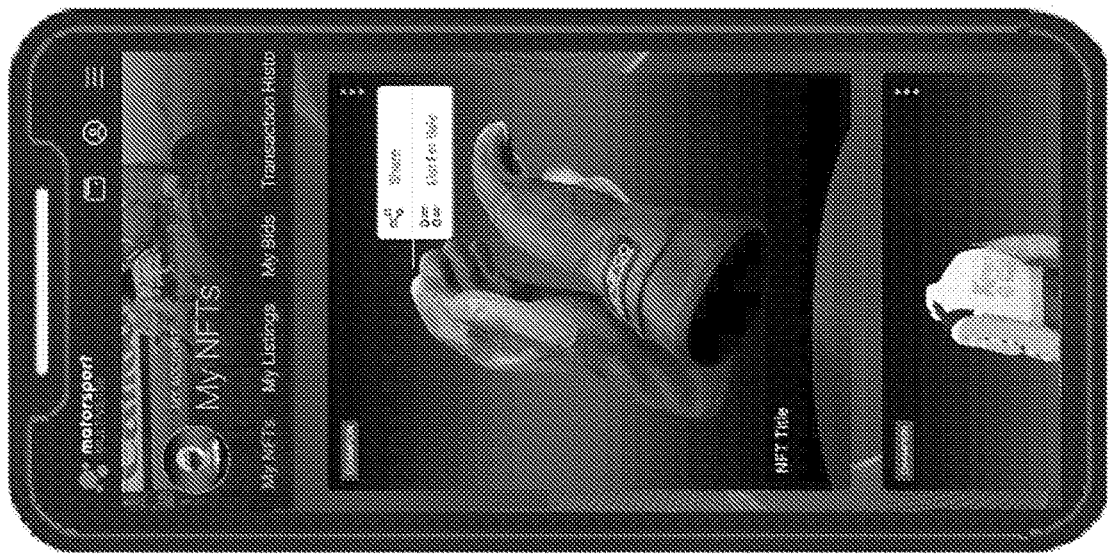
FIGS. 14A-14C depicts user interfaces of various media wallet applications in accordance with a number of embodiments of the invention.
Figure 14A:
Figure 14C:

Operation of media wallet applications implemented in accordance with some embodiments of the invention is conceptually illustrated by way of the user interfaces shown in FIGS. 14A-14C. In many embodiments, media wallet applications can refer to applications that are installed upon user devices such as (but not limited to) mobile phones and tablet computers running the iOS, Android and/or similar operating systems. Launching media wallet applications can provide a number of user interface contexts. In many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In several embodiments, a first user interface context is a dashboard (see, FIGS. 14A, 14C) that can include a gallery view of NFTs owned by the user. In several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content, including NFTs, fungible tokens, content that is not expressed as tokens such as content that has not yet been minted but for which the wallet can initiate minting, and other non-token content, including executable content, webpages, configuration data, history files and logs. This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on. A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet comprising the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions." A first partition may correspond to material associated with a first set of public keys, a second partition to material associated with a second set of public keys not overlapping with the first set of public keys, wherein such material may comprise tokens such as crypto coins and NFTs. A third partition may correspond to usage data associated with the wallet user, and a fourth partition may correspond to demographic data and/or preference data associated with the wallet user. Yet other partitions may correspond to classifications of content, e.g., child-friendly vs. adult; classifications of whether associated items are for sale or not, etc.

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world. When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of his or her wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platforms NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In some embodiments, the first social NFT may then be associated with some rights and capabilities, which may be expressed in other NFTs.

Additional rights and capabilities may also be directly encoded in a policy of the social security number NFT.

Figure 15:
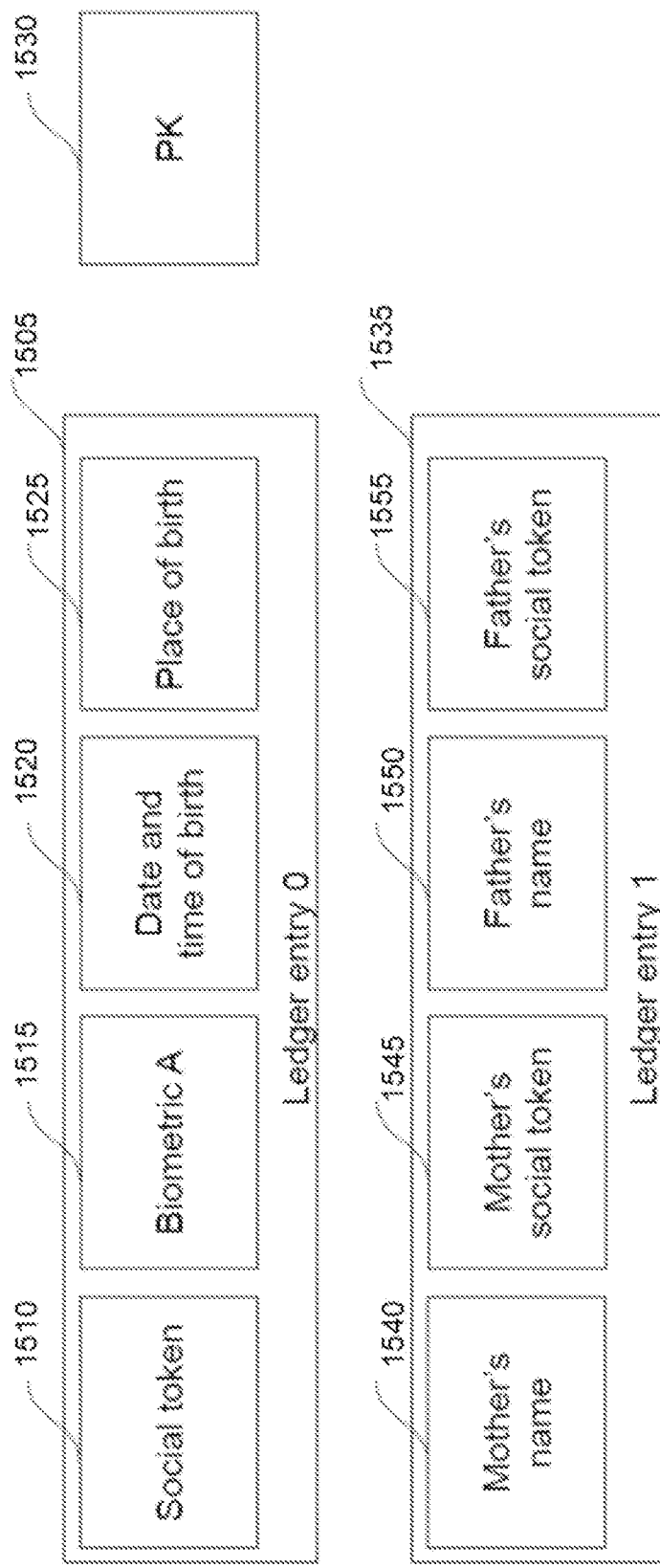
FIG. 15 illustrates an NFT ledger entry corresponding to an NFT identifier.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including but not limited to mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future offspring, marriages, familial history, photographs, videos, tax filings, and/or patent filings. The management and/or maintenance of an individual's biometrics throughout the individual's life may be immutably connected to the first social NFT given the use of a decentralized blockchain ledger.

In some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse can be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form.

In a number of embodiments, the machine-readable and human-readable elements can be generated one from the other. In some embodiments, an agreement in a machine-readable form may include, but is not limited to, a policy and/or an executable script. In some embodiments, an agreement in a human-readable form may include, but is not limited to, a text and/or voice-based statement of the promise.

In some embodiments, regardless of whether the machine-readable and human-readable elements are generated from each other, one can be verified based on the other. Smart contracts including both machine-readable statements and human-accessible statements may also be used outside the implementation of promise NFTs. Moreover, promise NFTs may be used outside actions taken by individual NFTs and/or NFT-owners. In some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horse X wins.

A promise NFT may be associated with actions that cause the execution of a policy and/or rule indicated by the promise NFT. In some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In some such methods, the match may be between the promise NFT and inputs that identify that the conditions are satisfied, where said input can take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In some such embodiments, two parties may wish to purchase an expensive work of digital artwork represented by an NFT. The parties can enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. An anchored NFT may tie to another NFT, which may make it both anchored and relative. An example of such may be called pseudonym NFTs.

Pseudonym NFTs may be a kind of relative NFT acting as a pseudonym identifier associated with a given social NFT. In some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers represented by an anchored NFT that is related to a physical entity (the hardware), may have access rights to WiFi networks. When computers are replaced with newer models, users may want to maintain all old relationships, for the new computer. For example, users may want to retain WiFi hotspots. For this to be facilitated, a new computer can be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs can be used to selectively transfer rights associated with one NFT to one or more NFTs, where such NFTs may correspond to users, devices, and/or other entities, when such assignments of rights are applicable. Inheritance NFTs can also be used to transfer property. One way to implement the transfer of property can be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identifies unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including but not limited to, what portions of a building employees may access, and what computer system employees may utilize. In several embodiments, employee NFTs may incorporate their owner's biometrics, such as a face image. In a number of embodiments, employee NFTs may operate as a form of promise NFT. In some embodiments, employee NFT may comprise policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rightsholder information, including but not limited to, licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including but not limited to traditional computers, mobile computers, and virtual reality display devices. Script tokens may be used to provide the content for game avatars, digital assistant avatars, and/or instructor avatars. Script tokens may comprise audio-visual information describing how input text is presented, along with the input text that provides the material to be presented. It may also comprise what may be thought of as the personality of the avatar, including how the avatar may react to various types of input from an associated user.

In some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers can generate parts of the content, allowing for large-scale content collaboration.

Features of other NFTs can be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements can also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g. script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers can identify how to make their content more desirable to intended target groups.

The generation of evaluations can be supported by methods including, but not limited to machine learning (ML) methods, artificial intelligence (AI) methods, and/or statistical methods. Anomaly detection methods developed to identify fraud can be repurposed to identify outliers. This can be done to flag abuse risks or to improve the evaluation effort.

Multiple competing evaluation units can make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
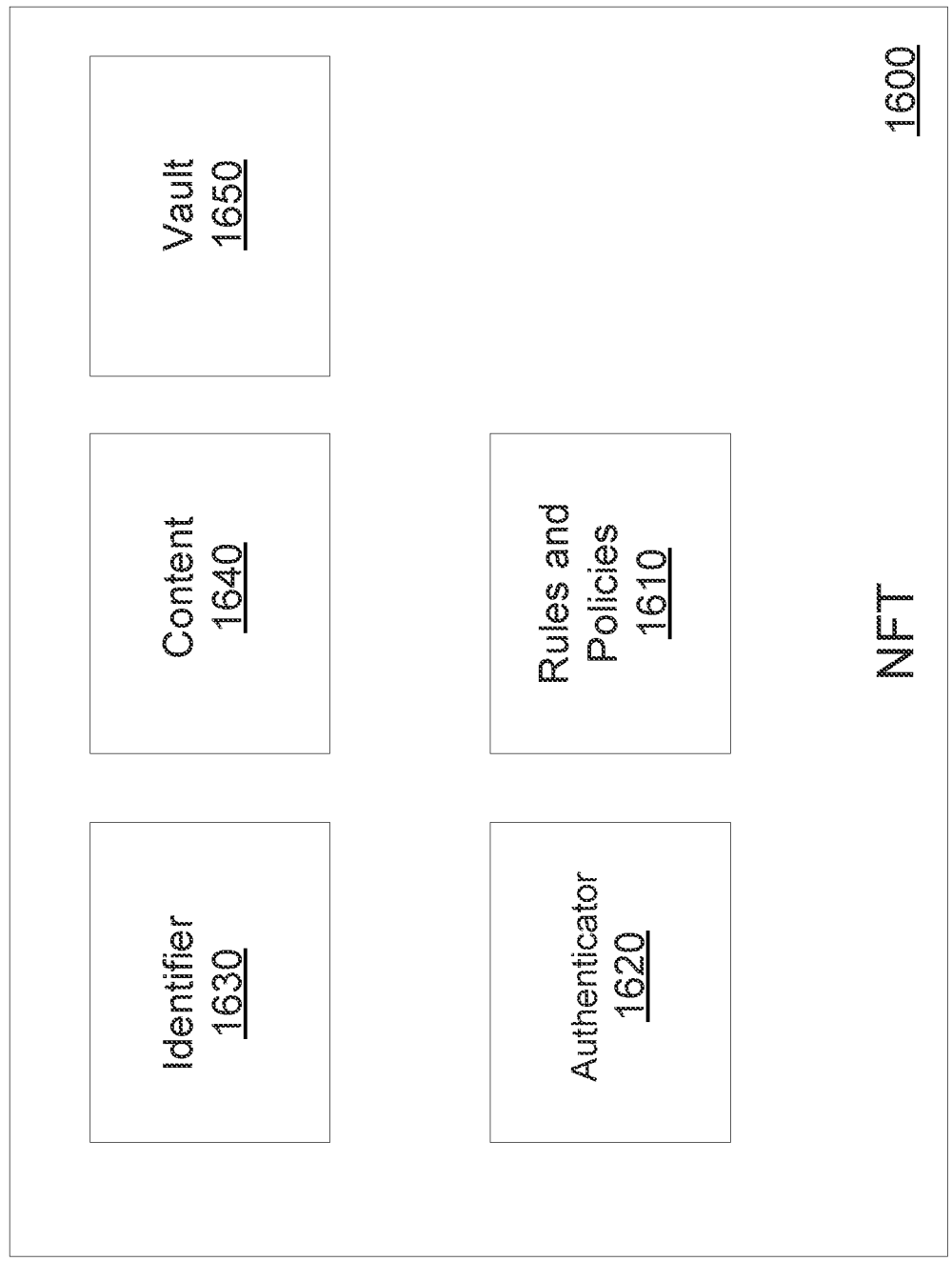
FIGS. 16A-16B illustrate an NFT arrangement relationship with corresponding physical content in accordance with an embodiment of the invention.
Figure 16B:

An example NFT which may be associated with specific content in accordance with several embodiments of the invention is illustrated in FIG. 16. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

An example of a physical element 1690 corresponding to an NFT, in accordance with some embodiments of the invention is illustrated in FIG. 16. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value) value. In accordance with many embodiments of the invention, a digital authenticity value (DAV) 1680 may be therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
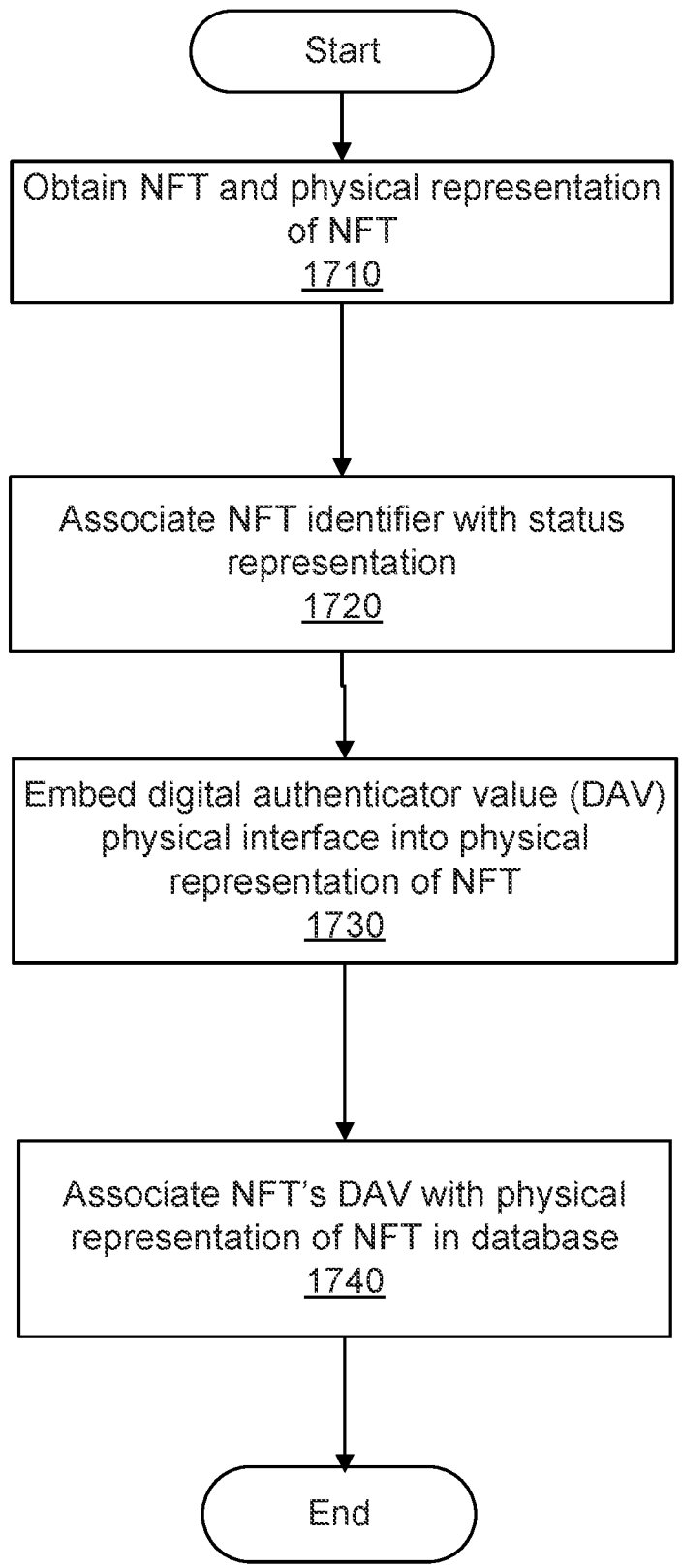
FIG. 17 illustrates a process for establishing a relationship between an NFT and corresponding physical content.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In some embodiments, the association can be performed through making note of the transaction and clarifying that it encapsulates both the mouse painting and the mouse NFT.

While specific processes are described above with reference to FIGS. 15-17, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

Protection Against Token-Based Malicious Scripts

NFT platforms in accordance with many embodiments provide protection against various different types of malicious script-based abuses that can be introduced in token-based environments. NFT platforms can include different execution environments that facilitate the storage and usage of tokens, including digital wallets and/or digital wallet applications, digital rights management (DRM) systems that can include secure software and/or hardware, secure execution environments such as TrustZone among others that can provide security assurances using secure boot processes. NFT platforms in accordance with many embodiments can include software and/or hardware configurations that protect an execution environment against potential abuses.

NFT platforms in accordance with many embodiments of the invention provide protection against malicious scripts by configuring an execution environment that includes a partition of separate secure storages compartments (e.g., sandboxes) for storing elements including tokens, and different tokens with different access restrictions can be allocated to different secure storages compartments. An NFT platform can include a secure manager module that can use a restricted interface to provide access to the different secure storage areas within an execution environment and to the particular set of tokens and associated token data stored therein. A restricted interface can include a restricted application programming interface (API) and/or a physically constrained interface. In many embodiments, a secure manager module can control which tokens are permitted and/or restricted from access to tokens and associated data stored within the different secure storage areas of an execution environment of an NFT platform.

In many embodiments, a token can be configured to include several data elements, each data element providing a particular type of data, where the type of data can include a media file (e.g., movie, audio, images, text, among many other types of media) state data (e.g., user IDs, timestamps, transactions, royalties, among many other types of state related data), and/or metadata. In many embodiments, a data element of a token can include an access control setting that provides a policy regarding access to the data element by other entities requesting access to the data, including other tokens and/or processes that seek to perform computations on the data.

NFT platforms in accordance with many embodiments can include a restricted interface that can control access between tokens. In many embodiments, a restricted interface can facilitate access control restrictions, including controlling permitted and unpermitted/restricted types of access that can occur between tokens, including the extent to which different tokens can interact with each other, the types of data and/or particular data elements of a token that can be accessed, among various other policies that can be set for tokens. Different types of access can be specified between tokens, where the types of access can include read access (e.g., being able to view data and/or retrieve data), write access (e.g., being able to modify data, delete data, add data, etc.), and initiate execution of a function on a token (e.g., an ability of a token to initiate an execution of a process on another token, including execution of a function and/or script and/or including using data associated with a token to perform computations), among other types of access that may be specified as appropriate to the requirements of specific applications.

In certain embodiments, an NFT platform can include a restricted interface that can restrict certain unpermitted types of access for a token, thus providing protection ensuring that no unpermitted types of accesses are performed on the token. For different tokens with different access control settings, certain types of access may be permitted while other types of access may be restricted/unpermitted. In many embodiments, restricted types of access may protect against malicious attacks, including malicious script based attacks.

In particular, an unpermitted and potentially dangerous type of attack using access for a token may correspond to a branching into an executable segment at a position that is not intended (e.g., as intended by a software developer) to be a starting point for execution. The use of similar types of dangerous branches can be a common technique used in malicious attacks involving return-oriented programming (ROP). Accordingly, NFT platforms in accordance with many embodiments can include a restricted interface that can limit a capability of a bad-actor to perform ROP-based malicious attacks, as the restricted interface would not allow a bad-actor to access information related to code positions and thus the bad-actor would not be able to utilize a provided interfaces, namely the restricted interface, to branch to disallowed code positions. Accordingly, NFT platforms in accordance with many embodiments can include a restricted interface that restricts information related to code positions, and that may otherwise be used by a bad-actor to perform ROP-based attacked. In many embodiments, a restricted interface can control the data that is being transmitted to and/or obtained from an executable element associated with a token. In many embodiments of the NFT platforms, the restricted interface can control data including data related to tokens that utilize external code libraries, and the restricted interface can control and limit access to external code libraries.

Figure 18:
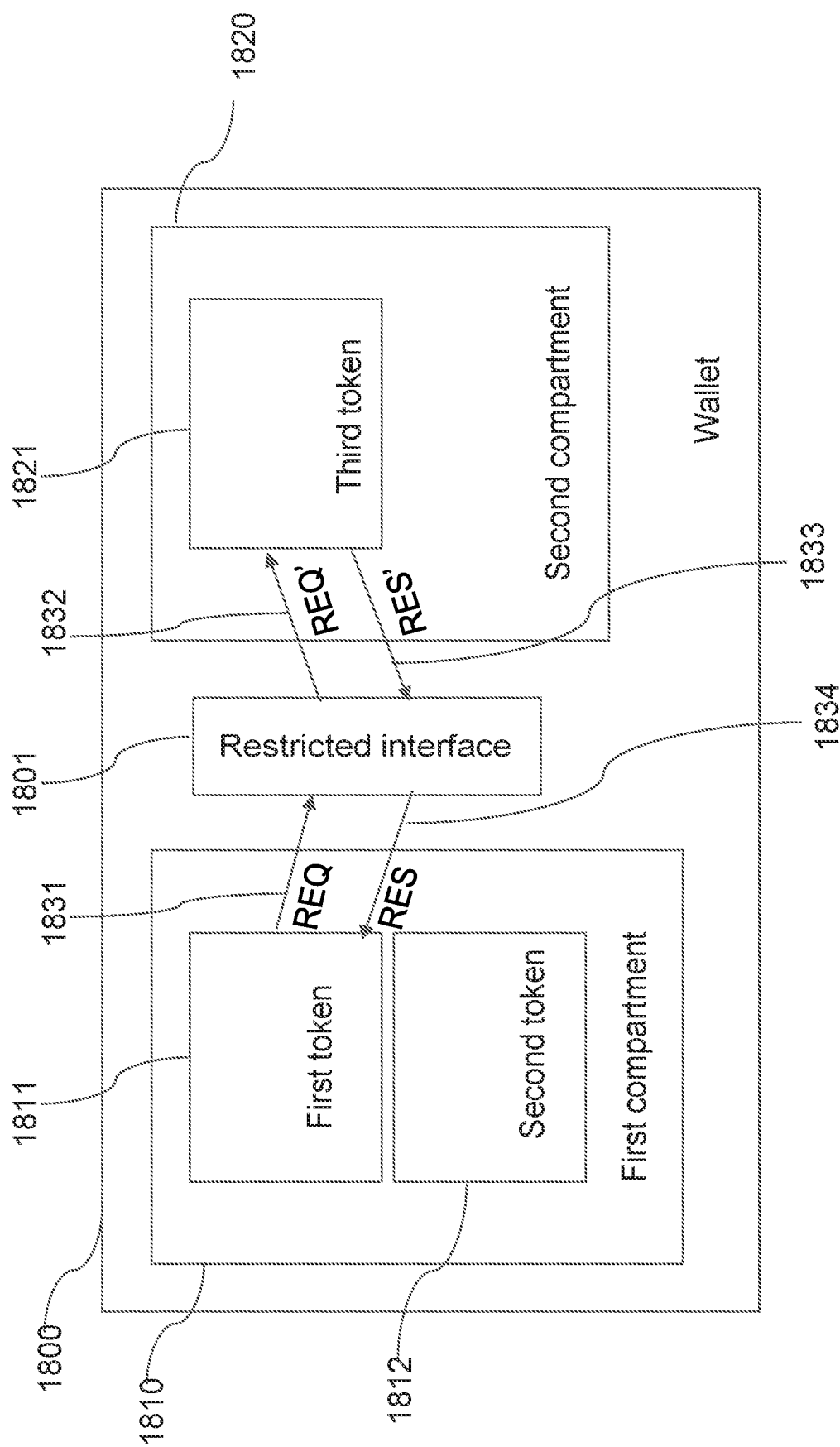
FIG. 18 illustrates a configuration of an NFT platform that includes a configuration of an execution environment partitioned with several secure storage compartments (e.g., sandboxes) in accordance with an embodiment of the invention.

A configuration of an NFT platform that includes a configuration of an execution environment partitioned with several secure storage compartments (e.g., sandboxes) in accordance with an embodiment of the invention is illustrated in FIG. 18. In particular, FIG. 18 illustrates an execution environment of a digital wallet 1800 that includes a first secure storage compartment 1810 storing a set of tokens and a second secure storage compartment 1820 storing a different set of tokens, where first compartment 1810 includes a first token 1811 and a second token 1812, and where the second compartment 1820 includes a third token 1821. First compartment 1810 and second compartment 1820 may correspond to separate sandboxes of wallet 1800. Each storage compartment can provide a particular set of access control settings for tokens stored within the compartment. Tokens within the different storage compartments can provide different access settings, including a first set of access settings for tokens stored in a same storage compartment, and a second set of access settings for tokens stored in a different storage compartment. In many embodiments, tokens within a same particular storage compartment may have direct access to other tokens within the same particular storage compartment (e.g., sandbox). In certain embodiments, tokens within different storage compartments may access data from each other only via a restrictive interface, where the restrictive interface can determine and control the access and/or data transferred between tokens. Accordingly, tokens within a same storage compartment may provide less restrictions for accessing data from other tokens in the same storage compartment while tokens requesting data from other tokens stored in different storage compartments may face more restrictions for accessing each other's data. In many embodiments, different storage compartments can include different access control restrictions, where a first storage compartment may provide less restrictions for accessing tokens stored in the first storage compartment, and a second storage compartment may provide more security and restrictions for tokens stored within the second storage compartment. Accordingly, different levels of security can be provided to different tokens based on the particular storage compartment to which the tokens are allocated. In certain embodiments, tokens within a same storage compartment can each have different access control settings.

In many embodiments, the first compartment 1810 and the second compartment 1820 may be passive storage areas. In certain embodiments, the first compartment 1810 and the second compartment 1820 may have associated processors enabling processing by the tokens held within the respective compartments. In certain embodiments that utilize passive storage compartments, the digital wallet 1800 can determine a set of tokens that should be executed to generate requests, such as request REQ 1831. In many embodiments, tokens within a particular storage compartment can have unrestricted access to each other. As illustrated, first token 1811 can have unrestricted access to second token 1812, and may have processing capabilities associated with first compartment 1810 and/or with wallet 1800. To access third token 1821 stored in the different second storage compartment 1820, first token 1811 can send a request REQ 1831 to restricted interface 1801 of wallet 1800. Request REQ 1831 can be evaluated by wallet 1800 to determine whether it is in compliance with access control limitations placed on first token 1811 by wallet 1800 and/or third token 1821. In many embodiments, a digital wallet can determine access control limitations using certificates associated with tokens. In certain embodiments, the certificates can be generated by an external service provider. In several embodiments, a digital wallet can retain an access control list (ACL) that specifies the access control settings for the different tokens held in the wallet.

In many embodiments, a request REQ' 1832 can be transmitted to third token 1821. Request REQ' 1832 may be different from request REQ 1831 to conform to the limitations and/or to match format-specific aspects of third token 1821. A response RES' 1833 can be generated from third token 1821 and transmitted to restricted interface 1801 of wallet 1800, which can transmit response RES 1834 to first token 1811. Response RES 1834 may be different from response RES' 1833. In many embodiments, a response may include (e.g., keep hidden) certain types of data associated with third token 1821 and exclude other private types of data associated with the third token 1821. In particular, a token may be allowed to access only certain data elements of another token and a response can include the permitted data elements. Although FIG. 18 illustrates a particular NFT platform with an execution environment that includes several secure storage compartments for storing tokens, any of a variety of configurations can be utilized to provide protection against malicious scripts as appropriate to the requirements of specific applications in accordance with embodiments of the invention.

NFT platforms in accordance with several embodiments can provide tokens with different types of access control settings, including direct access that can allow for direct access to other tokens and their associated data. In many embodiments, tokens can include access control settings regarding access to other tokens, including whether access is direct access whereby a token can access another token's data without needing to access via the restricted interface of the execution environment, and/or other types of access. For example, two tokens created by a same content creator may specify that the tokens may read and/or write each other's data and without having to perform this via restricted interfaces of the execution environment. Different types of access can be specified, including read access, write access, among other types of access that may be utilized as appropriate to the requirements of specific applications in accordance with embodiments of the invention.

In many embodiments, different types of access control settings may be specified for tokens, including symmetric access control settings and not symmetric access control settings. Symmetric access control settings may provide for a same set of access settings between tokens. For example, if a first token is allowed to access the data of a second token, then the second token may be allowed to access the data of the first token. In certain embodiments, certain access settings may not be symmetric, whereby tokens may have different access rights between one another. For example, a first token may be allowed by a second token to access its data directly, independently of the rights granted to the second token.

In many embodiments, access control settings of a token can be expressed using an access control list (ACL). For example, an ACL of a particular token may provide one or more identifiers of other tokens and associated access rights associated with the other tokens. In many embodiments, an ACL can be stored on an external server and accessed by an application that seeks to ascertain the access settings tokens of a particular token with respect to another token. In certain embodiments, an ACL can be held within a digital wallet and include information on tokens held within the wallet. In several embodiments, an ACL can be distributed among different entities, which can update the ACL as needed.

NFT platforms in accordance with several embodiments can determine access control settings of tokens using certificates associated with the tokens. For example, an NFT platform can use a security service provider that can scrutinize one or more tokens and generate certificates indicating access control settings between tokens, including a set of tokens that may access a different set of tokens and/or categories of tokens, and associate such certificates with the tokens that are provided the right to access the other tokens. In a further example, a second token may have rights to access a first token even though the first token was created prior to the second token and without knowledge of the possibility of the existence of a second related token.

NFT platforms in accordance with many embodiments can restrict certain token data of certain tokens and thus prevent certain types of access (e.g., read, write, initiate an execution of a process, among other types of access) to other tokens. As described, many embodiments of the NFT platforms can include tokens that include different data elements, where the different data elements can include different types of data and each data element can have a particular access control setting. Data elements of a token can include content storage elements (e.g., media files such as movies, music, images, among others), metadata elements that can include state data elements (e.g., data regarding whether a media file has been viewed, user IDs of people who have viewed the media file, purpose data, among others that can be used for different functions such as royalty reporting), among other types of data elements that can be included in a token as appropriate to the requirements of specific applications in accordance with embodiments of the invention.

For example, a first token may specify that a second token has the right to read a content storage element and to a metadata element associated with the token. A content storage element can include a media item (e.g., a movie in the content storage element). Tokens can include different data elements with different access control settings. For example, a first token may specify that a second token can have read access to a first content storage element (e.g., that include a media item), and restrict access to a second data element that includes state metadata. State metadata of a token can include for example, data indicating whether a movie has been watched, and by what user, which can be used for the purpose of royalty reporting. For example, a first token may be configured to extract ownership and/or licensing data and history from a second token which may include a fiction novel. The ownership data may enable a creator to better understand how content passes from owner to owner, how often, etc.

In many embodiments of the NFT platforms, different types of access control rights (e.g., read/write/initiate execution of a process) can be provided. As described, a type of access control right can include being able to initiate an execution of a process. For example, a first token may have access rights to read a data element portion of a second token, and perform a computation based on the data. A third token may not have this right, but may have the capability to cause the first token to initiate the access and to initiate the computation, if the first token has a form of access rights that allow the propagation of results. This can be a valuable type of access right in the context of token processing. For example, a first token can have access to a data element of a second token, such as a music file, such that the first token can read data, such as play-count data for royalty reporting, from the data element of the second token, and the read data can be analyzed and provided to a third token that may be allowed to read data from the first token for the purposes of advertising a new music file token for license and/or purchase. Accordingly, a first token can access and analyze data from a second token, and provide this analysis to a third token that requested data regarding this analysis from the first token.

Figure 19:
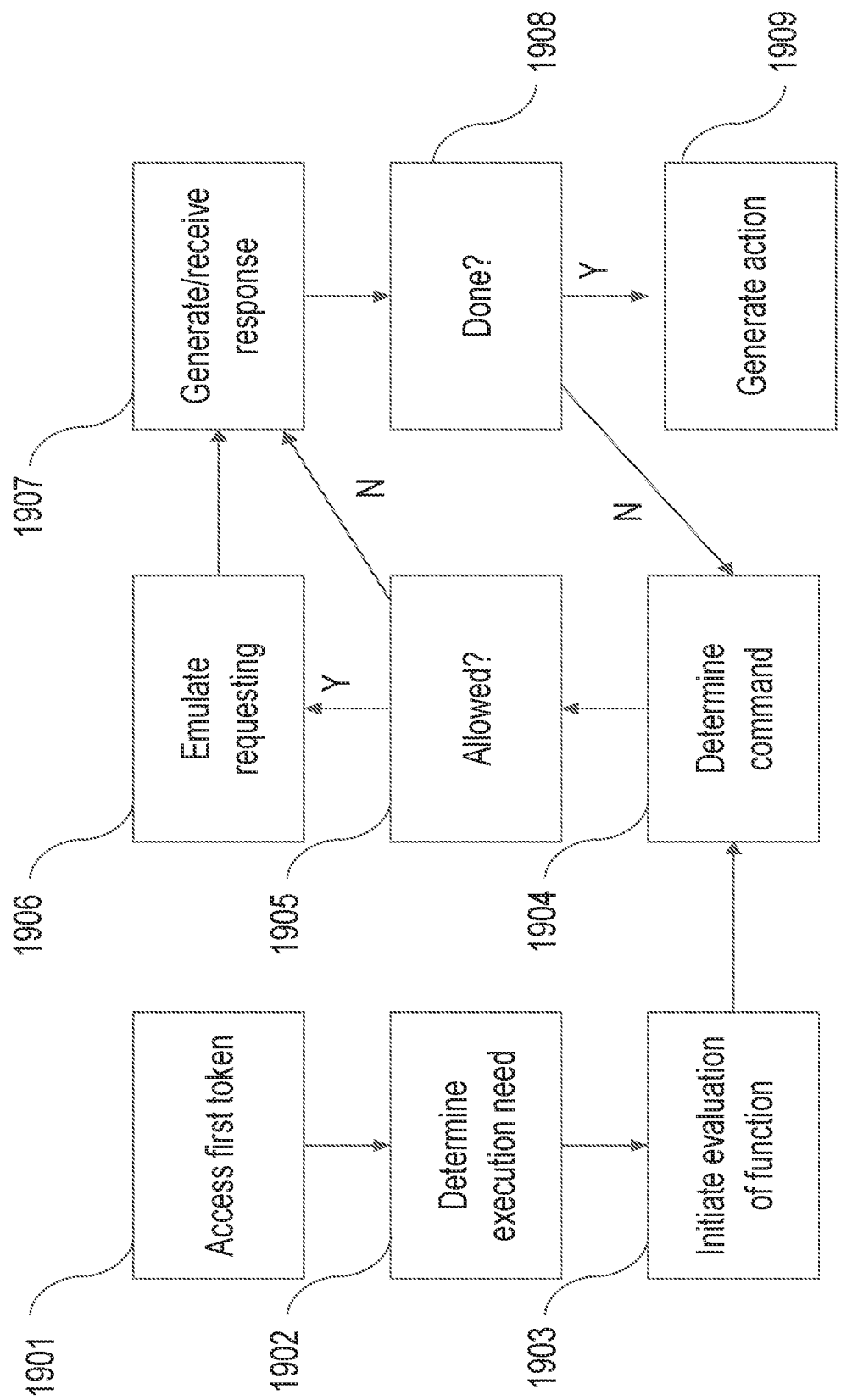
FIG. 19 illustrates a process of partitioning an execution environment into different secure storage compartments and allocating different tokens to the different secure storage compartments, where computations can be performed on tokens by a digital wallet in accordance with an embodiment of the invention.

FIG. 19 illustrates a process of partitioning an execution environment into different secure storage compartments and allocating different tokens to the different secure storage compartments, where computations can be performed on tokens by a digital wallet in accordance with an embodiment of the invention. In many embodiments, the compartments, including a first compartment and a second compartment can be passive storage areas that may not have explicit sandboxing.

The process can access (at 1901) a first token. First token may specify that a computation is to be performed. A token can include an indication for a wallet to evaluate a function that may be stored as part of token and/or indicated by the token and stored elsewhere, such as in wallet and/or an external storage resource.

The process can determine (at 1902) that there is an execution need associated with the first token. In many embodiments, the process can make this determination based on data in the first token and/or optional user input.

The process can initiate (at 1903) execution of a function to be evaluated.

The process can determine (at 1904) a command from the function. Different types of commands can be determined. For example, a command may be a request to perform an inventory of the tokens that are stored in the wallet and/or perform an evaluation on the tokens and/or other data in and/or associated with the wallet. The data can include logs of user actions among many other types of data.

The process can determine (at 1905) whether a command is allowed. The determination can be based on permission given to the first token by the token(s) to which the first token is requesting access. In many embodiments, a determination can be based on access control settings specified for the tokens. In several embodiments the process can use access control lists and/or certificates associated with tokens to determine permitted and/or restricted access for the tokens.

If the command is allowed, the process emulates (e.g., performs) (at 1906) the request. This may correspond to allowing access to data (e.g., reading/writing data) associated with a different token stored in a different storage compartment (e.g., associated with a third token) and/or communicate with an external resource.

If the command is not allowed, the process determines (at 1907) an associated response. The response may be an absence of data and/or denying a request if a request is not allowed.

The process determines (at 1908), whether the evaluation of the function initiated at 1903 has completed. If not, the process determines (at 1904) the next command. If the evaluation has completed, the process performs (at 1909) an action. An action can be to write data that is associated with a first token and/or to communicate with an external resource. Such communication may also be performed at 1906, where a request can be sent to an external resource and a response can be obtained at 1907. Although FIG. 19 illustrates a particular process for determining access control settings of tokens and performing commands accordingly, any of a variety of processes can be utilized to determine access control settings of tokens as appropriate to the requirements of specific applications in accordance with embodiments of the invention.

FIG. 20 illustrates a process for determining whether a requested action requested by or on behalf of a first token is permissible in accordance with an embodiment of the invention. The process analyzes (at 2001), one or more certificates related to a second token, on which actions are requested by or on behalf of the first token, and the associated privileges of the first token determined.

The process determines (at 2002), a set of limitations specified by second token. For example, one such limitation may state that only content data is allowed to be read by a first set of tokens, and that a second set of tokens may be allowed to use executable elements associated with the second token. The first token may belong to the first set or the second set of tokens, the membership of which may be determined by scrutinizing certificates associated with the first token.

The process determine (at 2003), limitations associated with the wallet. For example, a wallet that is running in a TEE may have fewer limitations than one that is not, for example.

The process determines (at 2004), the privileges that are required by a command associated with the request from the first token.

The process evaluates (at 2005), whether the required privileges determined at 2004 are permitted given the privileges determined at 2001, and the limitations determined in at 2002 and 2003.

If the privileges are in the allowed space then the process enables and performs (at 2006) the command and the results provided to the script executed by or on behalf of token.

Otherwise, the process determines (at 2007), whether a reduced command can be allowed, and if so, what the allowed command is. A description of the reduced command, along with the response to the reduced command may be provided to the script executed by or on behalf of token. Although FIG. 20 illustrates a particular process for determining whether a requested action requested by and/or on behalf of a first token is permissible, any of a variety of processes can be utilized to determine whether a requested action is permissible as appropriate to the requirements of specific applications in accordance with embodiments of the invention.

NFT platforms can include access control settings that provide "trusted" tokens that can perform computations on associated tokens. In particular, a first token can include an access control setting that the first token is trusted by a different second token such that the first token may be able to perform computations on the second token. Thus, a second token may set a first token as a "trusted" token and thus allow the first token to perform computation on it and its contents to enhance the corresponding functionality and/or simplify processing. Many embodiments of the NFT platforms can use trusted tokens to facilitate uniformity of access across different NFT platforms, in particular, where different NFT platforms (e.g., digital wallets, TEE, and/or digital rights management (DRM) software unit) may support different sets of access types and restrictions.

In many embodiments, different trusted tokens can have different capabilities. For example, a second trusted token may allow a first token to read content that the second token itself can read. A second trusted token may allow a first token to read any content data. A second trusted token may allow a first token to read state data associated with the second token. Accordingly, different trusted tokens (e.g., second trusted tokens) can provide different capabilities to other tokens (e.g., first token).

In many embodiments, rights granted to a first token by a second trusted token may be expressed by a policy. The policy can specify access control settings for a token and associated tokens. This may be expressed in the form of a vector where different entries correspond to different rights, and each entry can be an expression of the extent of rights of some type that a first token has. In many embodiments, each of the second trusted tokens may be associated with and/or contain multiple policies, where each policy is associated with one or more tokens that has the associated rights.

In many embodiments, entries in a policy can be binary. For example, an entry may have a number that expresses a type of security certification associated with a hardware platform on which a first token is running that is required for the first token to be given access to the resource associated with the entry.

For example, one entry related to reading of state data of a second token may include the number 4, which corresponds to a requirement that a first token must run on a platform that corresponds to classification 4 in order to be given access to the state data of a second token. Classification 4 may correspond to running in TrustZone 2.0 or a higher version, and having a malware detection engine that has been certified by the Token Malware Institute, and/or another trusted authority specified by the policy. A policy may state that any token that has an XYZ certification by certificate authority ABC may have access rights associated with a first policy, which may be expressed as a vector.

NFT platforms in accordance with many embodiments can partition an environment to include different storage compartments (e.g., sandboxing) and can allocate tokens to different storage compartments within the environment and control the manner in which tokens can access each others' document object models (DOMs), where a DOM can be used to receive requests from other tokens. Different types of requests can be generated by different tokens, including requests to obtain an inventory of other tokens present in the environment, among other types of requests.

In many embodiments, NFT platforms can set an environment that can further determine what tokens allow their presence to be known by a requesting token, and generate a response in accordance. Different tokens can provide different types of information in response to requests from other tokens. For example, a token may permit being reported to a requesting token, but not to be identified by a unique identity. Rather, it may demand to be represented by a type descriptor, a value descriptor, a functionality descriptor, and/or a combination of such descriptors. An example type descriptor can be "NFT". An example value descriptor can be "more than $10, less than $100". An example functionality descriptor can be "executable script for gaming". Different descriptors can be reported as appropriate to the requirements of specific applications in accordance with embodiments of the invention.

In many embodiments of the NFT platforms, a request can be transmitted from a token to an execution environment using an API. In certain embodiments, an execution environment may execute at least a portion of a token, including a script associated with the token, to determine a request that the token seeks to perform, and then provide a response to the script that the environment executes on behalf of the token. In certain embodiments, a token may include an indication of a particular script, maintained by an environment, to execute, and the environment can identity this particular script, and use other portions of the token associated with the request to determine parameters for the script, including for example, where to send responses.

In many embodiments, a response to a token requesting an inventory may include a list of access control settings of the different tokens, where the access control settings can specify the manner in which the requesting token may compute using the various reported tokens, including the particular data that can be read, the particular scripts that can be executed, among other types of information. This can be determined based on the access control settings associated with the requesting token, which may be transmitted along with the request, and/or automatically determined by an environment, which may have read access to all token data. In certain embodiments, some token data may be encrypted using a key that is not part of the token, rendering such data protected and thus not readable (e.g., may require access to a decryption key to decrypt the data).

In many embodiments of the NFT platforms, after a token receives a list of token descriptors, whether these can identify the tokens and/or types, among other types of information, and the associated access control settings associated with these tokens, the token may request, using an API to an environment, a set of read access and/or execution requests with respect to the tokens on the inventory. This may be determined by the environment, executing a script on behalf of a requesting token. The environment may determine that each such request is legitimate, e.g., that it complies with the stated access control rights granted to the requesting token by other tokens. In many embodiments, an environment may enclose a token in a storage compartment (e.g., sandbox) and/or enclose collections of tokens in storage compartments (e.g., sandboxes) separate from those of yet other tokens. This can serves to protect tokens against abusive scripts that aim to circumvent access limitations governed by the required use of APIs.

In many embodiments, a token can allow full access to another token, e.g., as specified by a certificate and/or access control list (ACL) as described, then the token that is granted access may not have to use a restrictive API of the environment to access the token granting access. In certain embodiments, a token that is granted access may still use an API, but without constraints that may otherwise have been present for a token that does not grant full read access. In several embodiments, the type of access rights a token grants to another token, as set by the access control settings, can specify the type of API function calls that it allows (e.g., the function calls a requesting token may make using the API to the environment). In many embodiments, an environment can determine that an API call is in compliance with granted access rights by determining that only allowed function calls, according to the granted access rights as set by the access control settings, are used by a requesting token.

In several embodiments of the NFT platforms, an access rights policy (e.g., access control settings) of a token can depend on a security posture of an environment (e.g., a digital wallet, among other execution environments), and the hardware and/or software of the environment that is executing (e.g., a trusted execution environment (TEE) such as TrustZone, among others). For example, a token may specify a first set of access control settings to other tokens in an environment with a first security posture, and a different second set of access control settings to other tokens in an environment with a second security posture. Different security postures can set different requirements. For example, a first security posture may be the running of an up-to-date anti-virus software suite from a vendor on a whitelist associated with the token and a second security posture may be the running of routines in a TrustZone environment, where the routines need to be certified with a whitelisted vendor. A first security posture may grant access to content, but not to state data, whereas a second security posture may grant access to both content and state data, but state the type of functions that may be computed based on the state data. Thus, different computations and access to data may be permitted for different execution environments, where a greater trustworthiness of an environment with a higher security posture may allow for more in-depth computations and/or more data access with less restrictions.

In several embodiments of the NFT platforms, an environment (e.g., a digital wallet), can log a type of queries made by tokens, including by what tokens, and what responses and/or types of responses are generated accordingly. Sensitive data such as data with personal identifiable information (PII) may be scrubbed to redact sensitive portions. The logs can be forwarded to a vendor to identify potential abuses, e.g., using anomaly detection techniques. Abuses may be performed by tokens. Abuses may be enabled on only some platforms, e.g., due to bugs or software shortcomings. By analyzing logs and identifying abuses, necessary wallet updates can be identified and prioritized.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A non-fungible token (NFT) platform for processing tokens in a distributed computing environment, comprising:
   a network interface;
   memory; and
   at least one processor executing on at least one computing unit from a plurality of computing units in a distributed computing environment, wherein a processor is configured to:
   store a plurality of tokens, wherein a token comprises a plurality of data elements and associated access control settings for accessing the plurality of data elements;
   identify a script to execute that is associated with a first token, wherein the script comprises at least one instruction for accessing data from at least one data element of a second token;
   determine, based on access control settings of the second token, that the first token has particular access rights to the at least one data element of the second token; and
   execute the script based on the particular access rights of the first token to the second token, wherein the execution of the script based on the particular access rights comprises blocking the script from executing when the particular access rights of the first token to the second token do not meet a requirement associated with the second token.

2. The NFT platform of claim 1, wherein executing the script comprises obtaining the data from the at least one data element of the second token and providing the data to an execution environment of the first token.

3. The NFT platform of claim 1, wherein the execution of the script comprises executing the at least one instruction.

4. The NFT platform of claim 1, wherein the execution of the script comprises executing a modification of the at least one instruction.

5. The NFT platform of claim 1, wherein the execution of the script comprises conveying a message to an entity indicated by the at least one instruction.

6. The NFT platform of claim 1, wherein the execution of the script based on the particular access rights comprises blocking the script from executing when the particular access rights of the first token to the second token do not meet a requirement associated with the execution environment.

7. The NFT platform of claim 1, further comprising: analyzing an access control list to determine access control settings of the second token, wherein the access control list provides access control settings for a plurality of tokens.

8. The NFT platform of claim 1, further comprising analyzing a certificate associated with the second token to determine access control settings of the second token, wherein the certificate is generated by an external service provider.

9. The NFT platform of claim 1, wherein for a particular token, access control settings specify access rights for at least one other token to the particular token, including permitted and restricted access and types of access to data elements of the particular token.

10. The NFT platform of claim 9, wherein a type of access is at least one access type selected from the group consisting of: read access, write access, and access to initiate execution of a process on a particular token.

11. The NFT platform of claim 1, wherein the token is a non-fungible token (NFT).

12. The NFT platform of claim 1, wherein the first token comprises at least a part of the script.

13. The NFT platform of claim 1, wherein an entity external to the first token stores at least a part of the script.

14. The NFT platform of claim 1, wherein the at least one instruction causes the detection of the second token.

15. The NFT platform of claim 1, wherein the at least one instruction performs a computation on data that is part of the second token.

16. The NFT platform of claim 1, wherein the at least one instruction causes the execution of a script associated with the second token.

17. The NFT platform of claim 1, wherein the at least one instruction performs a computation on state data associated with the second token.

18. The NFT platform of claim 1, wherein access control settings of a particular token are expressed at least in part by a certificate associated with the particular token.

19. The NFT platform of claim 1, wherein access control settings between a plurality of tokens are based on a similarity between the plurality of token.

* * * * *